(12) United States Patent
Okazaki et al.

(10) Patent No.: US 9,512,034 B2
(45) Date of Patent: Dec. 6, 2016

(54) HYDROPHILIC FILM

(75) Inventors: Koju Okazaki, Ichihara (JP); Noboru Kawasaki, Sakura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 619 days.

(21) Appl. No.: 12/933,743

(22) PCT Filed: Mar. 19, 2009

(86) PCT No.: PCT/JP2009/055398
§ 371 (c)(1),
(2), (4) Date: Sep. 21, 2010

(87) PCT Pub. No.: WO2009/116612
PCT Pub. Date: Sep. 24, 2009

(65) Prior Publication Data
US 2011/0008630 A1    Jan. 13, 2011

(30) Foreign Application Priority Data
Mar. 21, 2008    (JP) .................. 2008-073500

(51) Int. Cl.
C03C 17/30    (2006.01)
C09D 4/06    (2006.01)
C09D 183/08    (2006.01)
C08G 77/28    (2006.01)

(52) U.S. Cl.
CPC ............... C03C 17/30 (2013.01); C09D 4/06 (2013.01); C09D 183/08 (2013.01); C03C 2217/75 (2013.01); C08G 77/28 (2013.01); Y10T 428/31663 (2015.04)

(58) Field of Classification Search
None
See application file for complete search history.

(56) References Cited

U.S. PATENT DOCUMENTS

| | | | |
|---|---|---|---|
| 5,142,012 A * | 8/1992 | Furukawa et al. | ............ 526/279 |
| 2003/0134132 A1* | 7/2003 | Winterton et al. | ............ 428/451 |
| 2003/0224195 A1* | 12/2003 | Tysak | ............ 428/515 |
| 2004/0062872 A1* | 4/2004 | Matsumura | ............ 427/387 |
| 2006/0063011 A1* | 3/2006 | Hasskerl et al. | ............ 428/447 |
| 2009/0053411 A1* | 2/2009 | Sutter et al. | ............ 427/207.1 |
| 2009/0191373 A1 | 7/2009 | Okazaki et al. | |

FOREIGN PATENT DOCUMENTS

| | | | |
|---|---|---|---|
| CN | 1439452 A * | 9/2003 | |
| EP | 1572826 A * | 10/2006 | |
| JP | 4-225301 A | 8/1992 | |
| JP | 5-341107 A | 12/1993 | |
| JP | 5-341108 A | 12/1993 | |
| JP | 6-082605 A | 3/1994 | |
| JP | 6-088902 A | 3/1994 | |
| JP | 07026207 A * | 1/1995 | ............ C09D 183/04 |
| JP | 8-259270 A | 10/1996 | |
| JP | 9-077891 A | 3/1997 | |
| JP | 10-045927 A | 2/1998 | |
| JP | 2000-104046 A | 4/2000 | |
| JP | 2001-194502 A | 7/2001 | |
| JP | 2001-194503 A | 7/2001 | |
| JP | 2002128829 A * | 5/2002 | ............ C08F 30/08 |
| JP | 2003-005499 A | 1/2003 | |
| JP | 3557194 | 8/2004 | |
| JP | 2006053501 A * | 2/2006 | |
| JP | 2007-313674 A | 12/2007 | |
| JP | 1 475 459 B1 | 5/2009 | |
| WO | WO2004055127 A * | 7/2004 | |
| WO | WO 2007026015 A1 * | 3/2007 | |
| WO | WO 2007/064003 A1 | 6/2007 | |

OTHER PUBLICATIONS

WO2004055127 English language machine translation EPO and WIPO and English Translated Claims of EP1572826(2004).*
JP09077891 English language machine translation from JPO (1997).*
JP2006053501 English machine translation from JPO (2006).*
English Machine Translation of JP2002128829 (2002).*
CN 1439452 English machine translation from EPO (2003).*
English Machine Translation JP 07026207 JPO INPIT (1995).*
International Search Report (PCT/ISA/210) issued on May 19, 2009, by Japanese Patent Office as the International Searching Authority for International Application No. PCT/JP2009/055398.
F. Tsukiyama, "*Stain Resistant Water-based Coating Material*", Kobunshi: High Polymers, Japan, May 1995, p. 307, vol. 44, The Society of Polymer Science, Japan, ISSN 0454-1138, with English Translation.
A. Chida et al., "*A New Fluorine Type Surface-hydrophilizing Agent and Application Thereof to Stain Resistant Coating Materials*", Mirai Zairyo (Expected Materials for the Future), Jan. 10, 2002, pp. 36-41, vol. 2, No. 1. Japan, ISSN 1346-0986, with English Translation.
Y. Hayashi et al., "*Characterization of Glass Surface (1): Mechanisms of Various Surface-Related Phenomena on Glass*", Hyomen Kagaku (Surface Science), 2001, pp. 55-63, vol. 22, No. 1, Japan, with English Abstract.

* cited by examiner

Primary Examiner — Kenneth Stachel
(74) Attorney, Agent, or Firm — Buchanan, Ingersoll & Rooney PC

(57) ABSTRACT

A hydrophilic film that has high adhesion to inorganic materials and is safer and excellent in transparency and also exhibits both very high hydrophilicity and abrasion resistance, and a laminate including the hydrophilic film. The hydrophilic film is produced by applying a specific hydrophilic compound (c) having an acryloyl group and a potassium sulfonate group or the like to a surface of a layer formed from a mixture containing a silane compound (a) including one silicon atom, a mercapto group or the like, and at least one silicon-bonded group, and a silane compound (b) including at least four silicon-bonded groups and not including groups reactive with a carbon-carbon double bond, and allowing a reaction between at least a part of acryloyl groups contained in the hydrophilic compound (c) and at least a part of mercapto groups derived from the compound (a).

15 Claims, No Drawings

HYDROPHILIC FILM

TECHNICAL FIELD

The present invention relates to a hydrophilic film having excellent abrasion resistance and transparency and relates to a laminate.

BACKGROUND ART

Recently, it has been increasingly required that the surface of a transparent base material such as glass is prevented from clouding and also that inner and outer walls, bathrooms, display surfaces, and so on are prevented from being polluted.

The phenomenon that a surface clouds is caused by that fine water droplets adhering to the surface irregularly reflect light. This problem is solved by a method, for example, 1) rendering the surface water-absorptive to absorb water droplets, 2) rendering the surface hydrophilic to spread water droplets (formation of a water film) and thereby prevent light from being irregularly reflected, or 3) heating the surface to prevent coagulation of water. In general, the method 1) has disadvantages of a sharp reduction in the anti-clouding properties after saturation and a lack of hardness, and the method 3) has a disadvantage of a high running cost, and therefore the method 2) tends to be preferred.

At the same time, regarding the requirement for improvement in prevention of pollution, attention has been focused on a method of rendering a surface hydrophilic to provide self-cleaning properties (pollution-preventing properties) in which rainfall, watering, or the like makes pollution (e.g., hydrophobic material in the air) float above, and thereby the pollution is efficiently removed (Non-Patent Documents 1 and 2).

The present inventors have already proposed a method of hydrophilizing a surface (Patent Document 1). According to the method, a film having very high hydrophilicity can be obtained and is preferably applied to the use for preventing clouding and pollution, but the adhesion of the film to inorganic materials such as glass is not necessarily high in some cases, and therefore further studies such as searching of primer are necessary in the case of inorganic materials.

As hydrophilization to obtain high adhesion to inorganic materials, it is known a method in which a surface of an inorganic hard coat layer is treated with a reactive silane coupling agent and then a reactive group remaining on the surface is grafted (react) with a hydrophilic monomer (Patent Documents 2 and 3). As similar methods, there are, for example, a method using a silane coupling agent having a mercapto group and a hydrophilic monomer having a functional group that has a carbon-carbon double bond (Patent Document 4), a method using a silane coupling agent having a functional group that has a carbon-carbon double bond and a hydrophilic monomer having a mercapto group (Patent Document 5), a method using a silane coupling agent having an amino group and a hydrophilic monomer having a functional group that has a carbon-carbon double bond (Patent Document 6), and a method using a silane coupling agent having a functional group that has a carbon-carbon double bond and a hydrophilic monomer having a functional group that reacts or interacts with the functional group having a carbon-carbon double bond as well as a mercapto group (Patent Documents 7 and 8).

In addition, there is, for example, a method in which after treatment with a silane coupling agent having a functional group that has a carbon-carbon double bond, the surface is treated with sulfuric acid to convert the carbon-carbon double bond remaining on the surface into a hydroxyethyl group for hydrophilization (Patent Documents 9 to 12).

In the methods in Patent Documents 2 to 8, hydrophilization is possible, but since tri- or less functional silane coupling agents are used, the crosslink densities are low, and the degrees of hardness are insufficient. Therefore, high abrasion resistance is difficult to be obtained. Similarly, also in the methods of Patent Documents 9 to 12, hydrophilization is possible, but the methods are difficult to provide high abrasion resistance and also have problems of safety and corrosion of apparatuses due to the sulfuric acid treatment.

Patent Document 1: WO 2007/064003
Patent Document 2: Japanese Unexamined Patent Application Publication No. 4-225301
Patent Document 3: Japanese Unexamined Patent Application Publication No. 8-259270
Patent Document 4: Japanese Unexamined Patent Application Publication No. 2003-5499
Patent Document 5: Japanese Unexamined Patent Application Publication No. 2000-104046
Patent Document 6: Japanese Unexamined Patent Application Publication No. 2007-313674
Patent Document 7: Japanese Unexamined Patent Application Publication No. 2001-194502
Patent Document 8: Japanese Unexamined Patent Application Publication No. 2001-194503
Patent Document 9: Japanese Unexamined Patent Application Publication No. 6-82605
Patent Document 10: Japanese Unexamined Patent Application Publication No. 5-341107
Patent Document 11: Japanese Unexamined Patent Application Publication No. 5-341108
Patent Document 12: Japanese Unexamined Patent Application Publication No. 6-88902
Non-Patent Document 1: KOBUNSHI (POLYMER), 44(5), p. 307
Non-Patent Document 2: MIRAI ZAIRYO (FUTURE MATERIAL), 2(1), pp. 36-41

DISCLOSURE OF INVENTION

Problems to be Solved by the Invention

The present invention provides a hydrophilic film that has high adhesion to inorganic materials and is safer and excellent in transparency and also exhibits both very high hydrophilicity and abrasion resistance, and also provides a laminate including the hydrophilic film.

Means for Solving the Problems

The present inventors have conducted intensive studies to solve the problems described above and, as a result, have found that a hydrophilic film being excellent in transparency and excellent in adhesion to a base material and also having improved abrasion resistance can be obtained by forming a layer (hardened material layer) from a mixture containing a specific silane compound having, for example, a mercapto group and another specific silane compound on a base material and applying a specific hydrophilic compound to the layer for causing a reaction. Thus, the inventors have arrived at the present invention.

That is, the hydrophilic film of the present invention is obtained by applying a compound represented by a general formula (c) shown below to a surface of a layer formed from a mixture containing a silane compound (a) including one silicon atom, a group selected from the group consisting of a mercapto group, an amino group, a (meth)acryloyl group, and a vinyl group, and at least one silicon-bonded group selected from the group consisting of an alkoxy group, a halogen group, and a hydroxy group, and a silane compound (b) including a cross-linkable silicon-bonded group selected from the group consisting of an alkoxy group, a halogen group, and a hydroxy group and not including groups reactive with a carbon-carbon double bond; and allowing a reaction between at least a part of (meth)acryloyl groups contained in the compound represented by the general formula (c) and at least a part of groups derived from the compound (a), being selected from the group consisting of a mercapto group, an amino group, a (meth)acryloyl group, and a vinyl group,

[Formula 1]

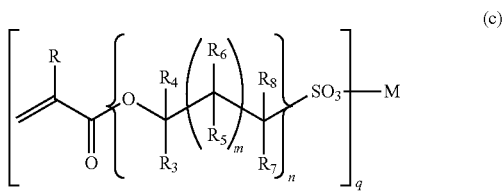

(c)

(in the formula (c), R represents H or $CH_3$; $R_3$ to $R_8$ independently represent H, $CH_3$, or OH; m represents an integer of 0 to 18; n represents an integer of 1 to 10; q represents 1 or 2; and M represents H, Li, Na, K, Rb, Mg, Ca, Sr, or Ba).

In the hydrophilic film, the molar ratio of the compound (a)/the compound (b) is preferably 1/2 to 1/200 and more preferably 1/3 to 1/100.

Furthermore, a laminate can be obtained by forming the hydrophilic film on a base material.

Additionally, a method of producing the laminate having the hydrophilic film of the present invention includes preparing a mixture containing a silane compound (a) including one silicon atom, a group selected from the group consisting of a mercapto group, an amino group, a (meth)acryloyl group, and a vinyl group, and at least one silicon-bonded group selected from the group consisting of an alkoxy group, a halogen group, and a hydroxy group, and a silane compound (b) including a cross-linkable silicon-bonded group selected from the group consisting of an alkoxy group, a halogen group, and a hydroxy group and not including groups reactive with a carbon-carbon double bond; applying the silane mixture to a base material and allowing hydrolysis and condensation reactions to progress and form a layer on the surface of the base material; and applying a compound represented by a general formula (c) shown below to the surface of the layer and allowing a grafting reaction between at least a part of (meth)acryloyl groups contained in the compound represented by the general formula (c) and at least a part of groups derived from the compound (a), being selected from the group consisting of a mercapto group, an amino group, a (meth)acryloyl group, and a vinyl group, to progress and form a hydrophilic film,

[Formula 2]

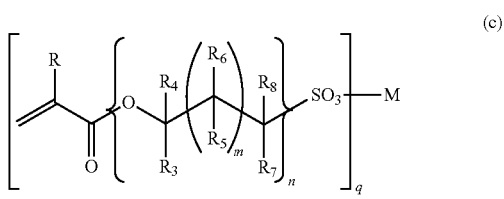

(c)

(in the formula (c), R represents H or $CH_3$; $R_3$ to $R_8$ independently represent H, $CH_3$, or OH; m represents an integer of 0 to 18; n represents an integer of 1 to 10; q represents 1 or 2; and M represents H, Li, Na, K, Rb, Mg, Ca, Sr, or Ba).

Furthermore, in the method of producing the laminate including the hydrophilic film, it is preferable that M of the compound (c) be H, Li, Na, Rb, Mg, Ca, Sr, or Ba and that the grafting reaction be performed under a temperature condition of 130° C. or higher.

Advantages

According to the present invention, it is possible to provide a transparent film that is excellent in adhesion to inorganic materials and exhibits both abrasion resistance and hydrophilicity at high levels and is thereby suitable for being applied to the use for preventing clouding and pollution.

BEST MODES FOR CARRYING OUT THE INVENTION

The present invention will be described in detail below.

In order to obtain the hydrophilic film according to the present invention, first, it is necessary to form a layer made from a mixture containing two specific types of silane compounds (silane mixture).

<Silane Compound (a)>

A characteristic point is that the mixture forming the layer contains a silane compound (a) including one silicon atom, a group selected from the group consisting of a mercapto group, an amino group, a (meth)acryloyl group, and a vinyl group, and at least one silicon-bonded group selected from the group consisting of an alkoxy group, a halogen group, and a hydroxy group (hereinafter, also referred to as silane compound (a)).

The alkoxy group is not particularly limited, but is usually an alkoxy group having 1 to 4 carbon atoms. Examples of the alkoxy group include a methoxy group, an ethoxy group, a propoxy group, and a butoxy group.

Examples of the halogen group include a fluoro group, a chloro group, a bromo group, and an iodo group. Among these groups, the chloro group is preferred from cost performance and so on.

The total number of the alkoxy group, the halogen group, and the hydroxy group that bind to one silicon atom contained in the silane compound (a) is not particularly limited as long as the silane compound (a) includes a mercapto group, but is usually in the range of 1 to 3. However, from the viewpoints of hardness and abrasion resistance of the hydrophilic film obtained in the present invention, the total number of the alkoxy group, the halogen group, and the hydroxy group that bind to the silicon atom is preferably in the range of 2 or 3 and more preferably 3. It is because that when the total number of these groups binding to the silicon atom is in the range above, the resulting film tends to have an increased crosslink density.

The silane compound (a) described above may further contain another group such as an aromatic group or an aliphatic group.

The silane compound (a) is preferably a compound represented by the following formula (a1):

[Formula 3]

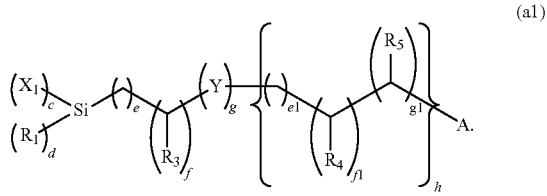

In the formula (a1), $R_1$ represents H or an alkyl group having 1 to 4 carbon atoms. In particular, as $R_1$, an alkyl group having 1 or 2 carbon atoms is relatively preferred.

In the formula (a1), $X_1$ represents a halogen group, an OH group (hydroxy group), or an alkoxy group having 1 to 4 carbon atoms. In particular, from the standpoint of reactivity, $X_1$ is preferably a halogen group, an OH group (hydroxy group), or an alkoxy group having 1 or 2 carbon atoms, and further considering the storage stability, an alkoxy group having 1 or 2 carbon atoms tends to be preferred.

In the formula (a1), $R_3$ to $R_5$ independently represent H, $CH_3$, or OH.

In the formula (a1), Ys independently represent O, S, NH, or $NCH_3$. In particular, as Y, O and NH are preferred, and O tends to be more preferred.

In the formula (a1), c represents an integer of 1 to 3; d represents an integer of 0 to 2; and c+d=3. From the viewpoint of increasing the crosslink density of a layer formed by a reaction with a silane compound (b) described below and thereby to form a stronger film, it is preferable that c=3 and d=0.

e, e1, f, and f1 independently represent an integer of 0 to 10. In particular, an integer of 0 to 5 is relatively preferred, and an integer of 0 to 3 tends to be more preferred.

In the formula (a1), g and g1 independently represent 0 to 2.

In the formula (a1), h represents an integer of 0 to 3. In particular, as h, an integer of 0 to 2 is preferred, and 0 or 1 tends to be more preferred.

In the formula (a1), A represents a mercapto group, an amino group, a (meth)acryloyl group, or a vinyl group, which is reactive with a carbon-carbon double bond.

The mercapto group, the amino group, the (meth)acryloyl group, or the vinyl group may be a group that binds to another group composed of, for example, carbon and thereby becomes a group having a mercapto group, an amino group, a (meth)acryloyl group, or a vinyl group.

Examples of the group having a mercapto group include a mercapto-methyl group, a 2-mercapto-ethyl group, a 2-mercapto-ethyloxy group, a 2-mercapto-ethylthio group, a 1-mercapto-ethyl group, a 3-mercapto-propyl group, a 3-mercapto-propyl-oxy group, a 2-mercapto-propyl-oxy group, a mercapto-phenyl group, a mercapto-phenyl-oxy group, a dimercapto-phenyl group, a dimercapto-phenyl-oxy group, a trimercapto-phenyl group, a mercapto-methyl-phenyl group, a mercapto-methyl-phenyl-oxy group, a 2-mercapto-ethylphenyl group, a 2-mercapto-propyl-phenyl group, a 2-mercapto-2-propyl-phenyl group, a mercapto-cyclohexyl group, a mercapto-cyclohexyl-oxy group, and a mercapto-methyl-cyclohexyl group.

Examples of the group having an amino group include an amino group, amino groups substituted by alkyl groups such as an N-methyl amino group, an N-ethyl amino group, an N-hydroxyethyl-amino group, an aminomethyl group, 1- and 2-aminoethyl groups, 1-, 2-, and 3-aminopropyl groups, a 1,2-diaminoethyl group, 1,2-, 1,3-, and 2,3-diaminopropyl groups, a benzyl amino group, an aminophenyl group, a benzamide group, and an acetamide group.

Examples of the group having a (meth)acryloyl group include a (meth)acryloyl group, a (meth)acryloyloxy group, a (meth)acryloylthio group, and a (meth)acrylamide group.

Examples of the group having a vinyl group include alkenyl groups such as a vinyl group, an allyl group, and an isopropenyl group, alkenylcarbonate groups such as an allylcarbonate group, and vinyl aromatic groups such as a styryl group and an α-methyl-styryl group.

Furthermore, in the compound (a1), M represents H, Li, Na, K, Rb, Mg, Ca, Sr, or Ba. Among them, from the viewpoint of that grafting reaction by means of heat lower than 130° C. or ultraviolet irradiation is efficiently performed, M is preferably K. However, as described below, when the grafting reaction is allowed to progress by heat not lower than 130° C., even if M is H, Li, Na, Rb, Mg, Ca, Sr, or Ba, the grafting reaction can be performed with high efficiency. Therefore, the resulting hydrophilic film can be provided with sufficient hydrophilicity.

In particular, the compound (a1) is preferably a compound, for example, shown in the following Table.

[Formula 4]

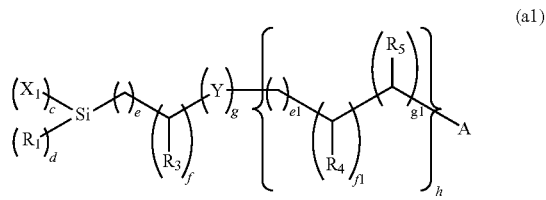

TABLE 1

|  | Compound 1 | Compound 2 | Compound 3 | Compound 4 | Compound 5 | Compound 6 | Compound 7 | Compound 8 |
|---|---|---|---|---|---|---|---|---|
| c | 3 | 2 | 3 | 3 | 3 | 3 | 3 | 3 |
| d | 0 | 1 | 0 | 0 | 0 | 0 | 0 | 0 |
| e | 2 | 1 | 2 | 2 | 1 | 2 | 3 | 3 |
| f | 1 | 0 | 1 | 1 | 0 | 1 | 0 | 0 |
| g | 0 | 0 | 0 | 1 | 1 | 0 | 1 | 1 |
| e1 | 0 | 0 | 0 | 1 | 6 | 0 | 0 | 1 |
| f1 | 0 | 0 | 0 | 1 | 0 | 0 | 0 | 1 |
| g1 | 0 | 0 | 0 | 0 | 0 | 0 | 0 | 1 |
| h | 0 | 0 | 0 | 0 | 0 | 0 | 0 | 1 |
| X1 | OMe | OEt | OMe | OMe | OMe | OMe | OMe | OMe |
| R1 | — | CH3 | — | — | — | — | — | — |
| R3 | H | — | H | H | — | H | — | — |

TABLE 1-continued

| | | | | | | | | |
|---|---|---|---|---|---|---|---|---|
| Y | — | — | — | NH | NH | — | O | NH |
| R4 | — | — | — | H | — | — | — | OH |
| R5 | — | — | — | — | — | — | — | H |
| A | mercapto | mercapto | amino | amino | amino | 2-amino-ethyl-amino | acryloyl | acryloyloxy |

| | Compound 9 | Compound 10 | Compound 11 | Compound 12 | Compound 13 | Compound 14 | Compound 15 | Compound 16 |
|---|---|---|---|---|---|---|---|---|
| c | 3 | 3 | 3 | 3 | 3 | 3 | 3 | 3 |
| d | 0 | 0 | 0 | 0 | 0 | 0 | 0 | 0 |
| e | 1 | 3 | 1 | 6 | 3 | 0 | 3 | 0 |
| f | 1 | 0 | 0 | 0 | 0 | 0 | 0 | 0 |
| g | 1 | 1 | 1 | 1 | 1 | 0 | 1 | 0 |
| e1 | 1 | 0 | 0 | 0 | 1 | 0 | 2 | 0 |
| f1 | 0 | 0 | 0 | 0 | 0 | 0 | 0 | 0 |
| g1 | 1 | 0 | 0 | 0 | 1 | 0 | 0 | 0 |
| h | 1 | 0 | 0 | 0 | 1 | 0 | 1 | 0 |
| X1 | OMe | OMe | OMe | OMe | OMe | OMe | OMe | OEt |
| R1 | — | — | — | — | — | — | — | — |
| R3 | CH3 | — | — | — | — | — | — | — |
| Y | O | O | O | O | NH | — | NH | — |
| R4 | — | — | — | — | — | — | — | — |
| R5 | CH3 | — | — | — | H | — | — | — |
| A | acryloyloxy | methacryloyl | methacryloyl | methacryloyl | acrylamide | styryl | styrylmethylamino | vinyl |

The silane compounds (a) described above may be used alone or in combination of two or more.

<Silane Compound (b)>

Another characteristic point is that the mixture for forming the layer contains, in addition to the silane compound (a), a silane compound (b) including at least four silicon-bonded groups selected from the group consisting of an alkoxy group, a halogen group, and a hydroxy group and not including groups reactive with a carbon-carbon double bond (hereinafter, also referred to as silane compound (b)).

The alkoxy group or the halogen atom binding to a silicon atom is easily hydrolyzed by moisture to be converted into a hydroxysilyl group. The hydroxysilyl group causes a condensation reaction with, for example, another hydroxysilyl group, an alkoxysilyl group, or a hydroxy group (OH group) of the base material surface. Therefore, the mixture including the compound having an alkoxy group, a halogen group, or a hydroxy group binding to a silicon atom forms a siloxane bond by hydrolysis and condensation reactions, and thereby the entire mixture is cross-linked to form a hardened material layer of which main component is silica.

Since the silane compound (a) necessarily includes at least one group selected from the group consisting of, a mercapto group, an amino group, a (meth)acryloyl group, and a vinyl group, as a silane compound, the maximum number of the groups that bind to one silicon atom, being selected from an alkoxy group, a halogen group, and a hydroxy group, is only three.

Therefore, when a hardened material layer of which main component is silica is formed from the silane compound (a) only, the resulting layer has an insufficient crosslink density and is difficult to be used for forming a film that can endure, for example, a severe abrasion test, and also the layer does not have necessarily sufficient hardness.

Furthermore, when a large number of groups that are not directly involved in the hydrolysis and condensation reactions of the silane compound, for example, silicon-bonded alkyl groups, is present in the silane compound, the hardened material layer formed from the silane compound is provided with an insufficient crosslink density.

Therefore, from the standpoint of further increasing the crosslink density of the resulting hardened material layer, it is important to use, in addition to the silane compound (a), the silane compound (b) including at least four silicon-bonded groups selected from the group consisting of an alkoxy group, a halogen group, and a hydroxy group and not including groups reactive with a carbon-carbon double bond.

In addition, the crosslink density can be effectively increased by using a silane compound (b) including 3- or 4-membered cyclic ether group (epoxy group or oxirane group) that reacts with a silicon-bonded hydroxyl group generated by hydrolysis of a silane compound and including at least two silicon-bonded groups selected from the group consisting of an alkoxy group, a halogen group, and a hydroxy group. Examples of the reaction between the silicon-bonded hydroxyl group and the 3- or 4-membered cyclic ether group are shown below:

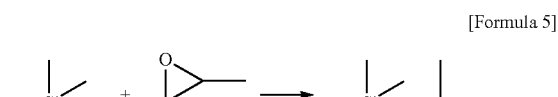

[Formula 5]

(reaction of epoxy group)

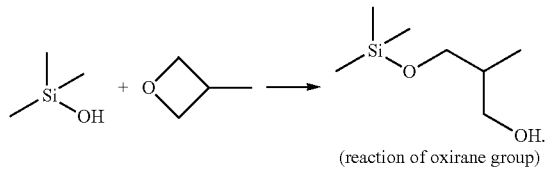

[Formula 6]

(reaction of oxirane group)

By using such a silane compound (b) together with the silane compound (a), a strong hardened material layer that can endure a severe abrasion test and has high hardness can be formed.

Considering, for example, cost performance and a decrease in workability due to an increase in viscosity and so on, the number of the silicon-bonded groups selected from the group consisting of an alkoxy group, a halogen group, and a hydroxy group contained in the silane compound (b) is preferably 4 to 20 and more preferably 4 to 10.

From the viewpoint of increasing the crosslink density of the hardened material layer, the total number of the alkoxy group, the halogen group, and the hydroxy group binding to silicon atoms and the binding group between the silicon atoms contained in the silane compound (b) is preferably larger than 3 when converted into per one silicon atom.

Incidentally, the binding group between the silicon atoms is a group coupling between two silicon atoms, and examples thereof include —O— in a siloxane bond and an alkylene group between silicon atoms.

The silane compound (b) is preferably a compound represented by any of general formulae (b1) to (b4) shown below.

[Formula 7]

(b1)

In the formula (b1), $X_1$ to $X_4$ independently represent a halogen atom, an OH group (hydroxy group), or an alkoxy group having 1 to 4 carbon atoms. In particular, from the standpoint of reactivity, $X_1$ to $X_4$ are each preferably a halogen atom, an OH group, or an alkoxy group having 1 or 2 carbon atoms, and further considering the storage stability, an alkoxy group having 1 or 2 carbon atoms tends to be preferred.

Examples of the compound represented by the formula (b1) include tetramethoxy-silane, tetraethoxy-silane, tetrapropoxy-silane, tetrabutoxy-silane, tetrafluoro-silane, tetrachloro-silane, tetrabromo-silane, tetraiodo-silane, tetrahydroxy-silane, trihydroxy-methoxy-silane, dihydroxy-dimethoxy-silane, hydroxy-trimethoxy-silane, trihydroxy-ethoxy-silane, dihydroxy-diethoxy-silane, hydroxy-triethoxy-silane, trihydroxy-chloro-silane, dihydroxy-dichloro-silane, and hydroxy-trichloro-silane.

[Formula 8]

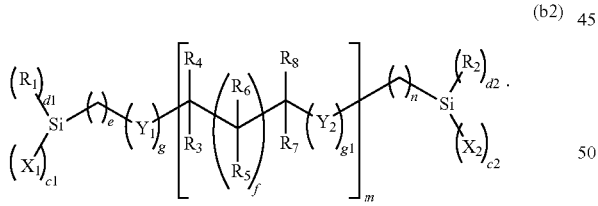

(b2)

In the formula (b2), $R_1$ and $R_2$ independently represent H or an alkyl group having 1 to 4 carbon atoms. In particular, $R_1$ and $R_2$ are each preferably an alkyl group having 1 or 2 carbon atoms.

In the formula (b2), $R_3$ to $R_8$ independently represent H, $CH_3$, or OH.

In the formula (b2), $X_1$ and $X_2$ independently represent a halogen atom, an OH group (hydroxy group), or an alkoxy group having 1 to 4 carbon atoms. In particular, from the standpoint of reactivity, $X_1$ and $X_2$ are each preferably a halogen atom, an OH group, or an alkoxy group having 1 or 2 carbon atoms, and further considering the storage stability, an alkoxy group having 1 or 2 carbon atoms tends to be preferred.

In the formula (b2), c1 and c2 independently represent an integer of 2 or 3; d1 and d2 independently represent an integer of 0 or 1; and c1+c2+d1+d2=6. From the viewpoint of increasing the crosslink density of the hardened material layer prepared from a mixture containing the silane compound (a) and the silane compound (b) and thereby to form a stronger film, it is preferable that c1=c2=3 and d1=d2=0.

In the formula (b2), e and f independently represent an integer of 0 to 10, and are each preferably an integer of 0 to 5 and more preferably an integer 0 to 3.

In the formula (b2), g and g1 independently represent an integer of 0 to 2.

In the formula (b2), m represents an integer of 0 to 18, and is preferably an integer of 0 to 8 and more preferably an integer of 0 to 2.

In the formula (b2), n represents an integer of 1 to 10, and is relatively preferably an integer of 1 to 6 and more preferably an integer of 1 to 4.

In the formula (b2), $Y_1$ and $Y_2$ independently represent O, S, NH, or $NCH_3$. In particular, as $Y_1$ and $Y_2$, O and NH are relatively preferred, and O is more preferred.

Examples of the compound represented by the formula (b2) include bis(trimethoxy-silyl)methane, 1,2-bis(trimethoxy-silyl)ethane, 1,6-bis(trimethoxy-silyl)hexane, bis{3-(trimethoxy-silyl)propyl}sulfide, bis{3-(trimethoxy-silyl)propyl}amine, N,N'-bis{3-(trimethoxy-silyl)propyl}-1,2-ethylene diamine, bis(triethoxy-silyl)methane, 1,2-bis(triethoxy-silyl)ethane, 1,8-bis(triethoxy-silyl)octane, O,O'-bis{3-(triethoxy-silyl)propyl}-poly(1,2-propylene oxide) with a molecular weight of about 1000, 1-(triethoxy-silyl)-2-(diethoxy-methyl-silyl)ethane, bis{3-(triethoxy-silyl)propyl}sulfide, bis{3-(triethoxy-silyl)propyl}tetrasulfide, bis{3-(triethoxy-silyl)propyl}amine, and bis{3-(diethoxy-methyl-silyl)propyl}amine.

[Formula 9]

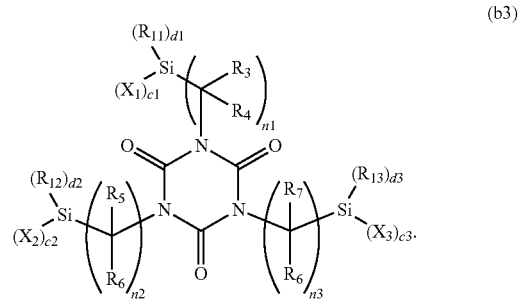

(b3)

In the formula (b3), $R_3$ to $R_8$ independently represent H, $CH_3$, or OH.

In the formula (b3), $R_{11}$ to $R_{13}$ independently represent H or an alkyl group having 1 to 4 carbon atoms. In particular, $R_{11}$ to $R_{13}$ are each preferably an alkyl group having 1 or 2 carbon atoms.

In the formula (b3), $X_1$ to $X_3$ independently represent a halogen atom, an OH group (hydroxy group), or an alkoxy group having 1 to 4 carbon atoms. In particular, from the standpoint of reactivity, $X_1$ to $X_3$ are each preferably a halogen atom, an OH group, or an alkoxy group having 1 or 2 carbon atoms, and further considering the storage stability, an alkoxy group having 1 or 2 carbon atoms tends to be preferred.

In the formula (b3), c1 to c3 independently represent an integer of 2 or 3; d1 to d3 independently represent an integer of 0 or 1; and c1+c2+c3+d1+d2+d3=9.

From the viewpoint of increasing the crosslink density of the hardened material layer formed from a mixture containing the silane compound (a) and the silane compound (b) and thereby to form a stronger film, it is preferable that c1=c2=c3=3 and d1=d2=d3=0.

In the formula (b3), n1 to n3 independently represent an integer of 1 to 10. In particular, as n1 to n3, an integer of 1 to 6 is relatively preferred, and an integer of 1 to 4 is more preferred.

Examples of the compound represented by the formula (b3) include N,N',N''-tris{(trimethoxy-silyl)methyl}isocyanurate, N,N',N''-tris{2-(trimethoxy-silyl)ethyl}isocyanurate, N,N',N''-tris{3-(trimethoxy-silyl)propyl}isocyanurate, N,N',N''-tris{4-(trimethoxy-silyl)butyl}isocyanurate, N,N',N''-tris{6-(trimethoxy-silyl)hexyl}isocyanurate, N,N',N''-tris{8-(trimethoxy-silyl)octyl}isocyanurate, N,N',N''-tris{10-(trimethoxy-silyl)decyl}isocyanurate, N,N',N''-tris{3-(triethoxy-silyl)propyl}isocyanurate, N,N',N''-tris{3-(tripropoxy-silyl)propyl}isocyanurate, and N,N',N''-tris{3-(tributoxy-silyl)propyl}isocyanurate.

[Formula 10]

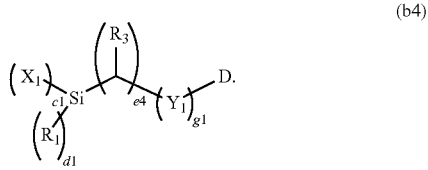

(b4)

In the formula (b4), $R_1$ represents H or an alkyl group having 1 to 4 carbon atoms. In particular, as $R_1$, an alkyl group having 1 or 2 carbon atoms is preferred.

In the formula (b4), $R_3$ represents H, $CH_3$, or OH.

In the formula (b4), $X_1$ represents a halogen atom, an OH group (hydroxy group), or an alkoxy group having 1 to 4 carbon atoms. In particular, from the standpoint of reactivity, $X_1$ is preferably a halogen atom, an OH group, or an alkoxy group having 1 or 2 carbon atoms, and further considering the storage stability, an alkoxy group having 1 or 2 carbon atoms is more preferred.

In the formula (b4), c1 represents an integer of 2 or 3; d1 represents an integer of 0 or 1; and c1+d1=3. From the viewpoint of increasing the crosslink density of the hardened material layer formed from a mixture containing the silane compound (a) and the silane compound (b) and thereby to form a stronger film, it is preferable that c1=3 and d1=0.

In the formula (b4), e4 represents an integer of 0 to 20. In particular, as e4, an integer of 0 to 10 is preferred, and an integer of 0 to 5 is more preferred.

In the formula (b4), g1 represents an integer of 0 to 2.

In the formula (b4), $Y_1$ represents O, S, NH, or $NCH_3$. In particular, as $Y_1$, O and NH are preferred, and O is more preferred.

In the formula (b4), D represents a functional group having a 3- or 4-membered cyclic ether structure. Examples of the functional group having such a structure include an epoxy group, a glycidyl group, a cyclohexene oxide group, a styrene oxide group, an oxetane group, an oxetanyl-methyl group, an oxetanyl-ethyl group, a 2-methyl-2-oxetanyl-methyl group, and a 2-ethyl-2-oxetanyl-methyl group. In these functional groups having a 3- or 4-membered cyclic ether structure, more preferred forms are an epoxy group, a glycidyl group, a cyclohexene oxide group, an oxetane group, and a 2-ethyl-2-oxetanyl-methyl group. Furthermore, an epoxy group, a glycidyl group, and a cyclohexene oxide group tend to be more preferred.

Examples of the compound represented by the formula (b4) include epoxy-trimethoxysilane, epoxy-triethoxysilane, glycidyl-trimethoxysilane, glycidyl-oxy-trimethoxysilane, 2-trimethoxysilyl-ethyl(3,4-cyclohexene oxide), 4-(trimethoxysilyl)-styrene oxide, glycidyloxymethyl-trimethoxysilane, glycidyloxyethyl-trimethoxysilane, glycidyloxypropyl-trimethoxysilane, glycidyloxypropyl-(methyl-dimethoxy-silane), glycidyloxypropyl-triethoxysilane, glycidyloxypropyl-trichlorosilane, and glycidyloxypropyl-trihydroxysilane.

The silane compounds (b) described above may be used alone or in combination of two or more.

The silane mixture described above may contain the silane compound (a) and the silane compound (b) separately or as a polycondensation product of the silane compound (a) and the silane compound (b). Examples of the polycondensation product include oligomer-type silane compounds composed of the silane compound (a) and the silane compound (b) that are polycondensated (for example, X-41-1805 (product name of Shin-Etsu Chemical Co., Ltd.), which is a polycondensation product of MPMOS and tetraethoxysilane).

<Hydrophilic Compound (c)>

The present invention is characterized in that a compound represented by a general formula (c) shown below (hereinafter, also referred to as hydrophilic compound (c)) is applied to a surface of a hardened material layer of which main component is silica prepared by hydrolysis and condensation of a mixture containing the silane compound (a) and the silane compound (b) and thereby to allow at least a part of the carbon-carbon double bonds contained in the hydrophilic compound (c) to react with at least a part of the mercapto groups derived from the compound (a).

[Formula 11]

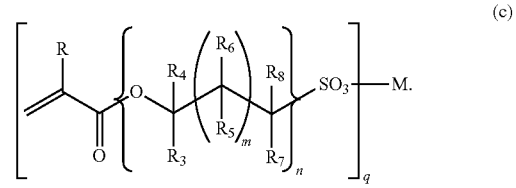

(c)

In the formula (c), R represents H or $CH_3$; $R_3$ to $R_8$ independently represent H, $CH_3$, or OH; m represents an integer of 0 to 18; n represents an integer of 1 to 10; q represents 1 or 2; and M represents H, Li, Na, K, Rb, Mg, Ca, Sr, or Ba.

The hydrophilic compound (c) is excellent in reactivity or interaction with a group (for example, a mercapto group) present on the surface of the hardened material layer formed from a mixture containing the silane compound (a) and the silane compound (b) and is excellent in hydrophilicity.

The hydrophilic compound (c) is excellent in hydrophilicity, because it includes a sulfonic acid group or a metal sulfonate group (a lithium sulfonate group, a sodium sulfonate group, a potassium sulfonate group, a rubidium sulfonate group, a magnesium sulfonate group, a calcium sulfonate group, a strontium sulfonate group, or a barium sulfonate group).

In general, in addition to the sulfonic acid group and the metal sulfonate groups, a sodium phosphate group, a phosphoric acid group, a potassium carboxylate group, a sodium carboxylate group, a carboxylic acid group, and a hydroxy group are also known as hydrophilic groups.

Compared to these hydrophilic groups, the sulfonic acid group and the metal sulfonate groups have characteristics that the hydrophilicity is maintained to be high even after at least a part of carbon-carbon double bonds contained in the compound (c) reacted with the mercapto group, the amino group, the (meth)acryloyl group, or the vinyl group derived from the compound (a).

Thus, in order to form the hydrophilic film of the present invention, it is important that the compound (c) include a sulfonic acid group or a metal sulfonate group (a lithium sulfonate group, a sodium sulfonate group, a potassium sulfonate group, a rubidium sulfonate group, a magnesium sulfonate group, a calcium sulfonate group, a strontium sulfonate group, or a barium sulfonate group).

Furthermore, the hydrophilic group of the hydrophilic compound (c) is not particularly limited as long as it is a sulfonic acid group or a metal sulfonate group mentioned above, but can be arbitrarily selected considering the characteristics and cost performance of each hydrophilic group.

For example, the rubidium sulfonate group tends to be not preferred from the cost performance as the hydrophilic group of the hydrophilic compound (c).

The hydrophilic compound (c) is further characterized by including an (meth)acryloyl group as shown in the above-mentioned formula (c). The (meth)acryloyl group contained in the hydrophilic compound (c) increases the reactivity with a mercapto group, an amino group, a (meth)acryloyl group, or a vinyl group, derived from the silane compound (a), being present in the hardened material layer of which main component is silica formed from a mixture containing the silane compound (a) and the silane compound (b).

In the compound (c), $R_3$ to $R_8$ are each preferably H or OH and more preferably H.

In the compound (c), m is preferably an integer of 0 to 8 and more preferably an integer of 0 to 2.

In the compound (c), n is preferably an integer of 1 to 6 and more preferably an integer of 1 to 4.

Examples of the compound (c) include 2-sulfoethyl acrylate, 3-sulfopropyl acrylate, 2-hydroxy-3-sulfopropyl acrylate, 4-sulfobutyl acrylate, 6-sulfohexyl acrylate, 8-sulfooctyl acrylate, 9-sulfo-3,6-dioxanonyl acrylate, and 10-sulfodecyl acrylate; and their lithium salts, sodium salts, potassium salts, rubidium salts, magnesium salts, calcium salts, strontium salts, and barium salts.

The hydrophilic compounds (c) described above may be used alone or in combination of two or more.

<Silane Mixture>

The hydrophilic film of the present invention is produced on a base material surface as follows.

A mixture containing the silane compound (a) and the silane compound (b) (hereinafter, also referred to as "silane mixture") is subjected to a reaction with water on the base material surface to hydrolize an alkoxy group or a halogen atom binding to a silicon atom and thereby to form a hydroxysilyl group. In usual, the hydroxysilyl group, for example, when heated, causes a condensation reaction with another hydroxysilyl group or an alkoxysilyl group (for example, reaction for producing a siloxane bond). Thus, from the silane mixture, a layer of which main component is silica (also referred to as a hardened material layer or a reactive silica layer) is formed by cross-linking the entire mixture on the base material.

In addition, since the hydroxysilyl group formed from the silane mixture during the reaction, for example, when heated, causes a condensation reaction or strong interaction with a functional group, such as a hydroxy group (OH group), of the base material surface, adhesion between the base material and the hardened material layer becomes stronger.

Furthermore, examples of the water used in the reaction of the silane mixture include moisture in the air and water willingly added to the silane mixture.

The hydrophilic film of the present invention is obtained by applying the hydrophilic compound (c) to the thus obtained hardened material layer and thereby to allow a group derived from the silane compound (a) to react with a group of the hydrophilic compound (c). A film formed by hardening the hydrophilic compound (c) alone tends to have insufficient hardness. Therefore, from the standpoint of increasing the hardness of a hydrophilic film, it is also important to sufficiently increase the hardness of the hardened material layer. In order to thus sufficiently increase the hardness of the hardened material layer, use of the silane compound (a) alone is insufficient, and it is necessary to use a silane mixture containing both the silane compound (a) and the silane compound (b).

In particular, in order to form a hydrophilic film having excellent abrasion resistance, it is necessary to forma stronger hardened material layer. Therefore, the molar ratio of the compound (a)/the compound (b) contained in the silane mixture is preferably 1/2 or less, more preferably 1/3 or less, and further preferably 1/4 or less.

In addition, in the hydrophilic film of the present invention, from the viewpoint of increasing the hydrophilicity, it is desirable that the hydrophilic compound (c) be in sufficient contact to the hardened material layer obtained from the silane mixture. Therefore, it is desired that the acryloyl group contained in the hydrophilic compound (c) sufficiently react with a mercapto group, an amino group, a (meth)acryloyl group, or a vinyl group derived from the silane compound (a) contained in the hardened material layer. Accordingly, the molar ratio of the compound (a)/the compound (b) contained in the silane mixture is preferably 1/200 or more, more preferably 1/100 or more, more preferably 1/50 or more, and further preferably 1/30 or more.

The silane mixture containing the silane compound (a) and the silane compound (b) may further contain a solvent. Examples of the solvent include alcohols such as methanol, ethanol, isopropanol (IPA), n-butanol, and methoxyethanol; aprotic polar solvents such as acetonitrile, DMF, and DMSO; ester-based solvents such as ethyl acetate, butyl acetate, and isoamyl acetate; ketone-based solvents such as acetone, methyl ethyl ketone, and methyl isobutyl ketone; and solvent mixtures thereof.

Furthermore, the silane mixture may contain various types of fillers according to need.

Examples of the fillers include wood powder, pulp, cotton chip, asbestos, glass fiber, carbon fiber, mica, walnut shell flour, rice hull flour, graphite, diatomaceous earth, white earth, silica, silica sol, nanosized silica, methylated silica, surface-modified silica, humed silica, precipitated silica, anhydrous silicic acid, carbon black, calcium carbonate, magnesium carbonate, clay, talc, titanium oxide, cerium oxide, magnesium carbonate, quartz powder, aluminum fine powder, iron oxide, flint powder, and zinc powder. These fillers may be used alone or in combination of two or more.

Furthermore, the silane mixture may contain various types of additives, according to need.

Examples of the additives include a UV absorber, a hindered amine light stabilizer (HALS), a radical scavenger, an antioxidant, a polymerization inhibitor, an age inhibitor, an antiozonant, a metal deactivator, a storage stability enhancer, a pigment, a dye, a binder, a leveling agent, and a hardening aid such as alkoxytitanium.

In the silane mixture containing the silane compound (a) and the silane compound (b), water is usually required for progressing hydrolysis (reaction for producing a hydroxysilyl group) and condensation (reaction for producing a siloxane bond). The water may be that derived from moisture in the air, but is usually added to the silane mixture.

The addition amount of water is usually in the range of 0.1 to 100 equivalents, preferably 0.5 to 10 equivalents, and further preferably 1 to 5 equivalents of the total moles of the alkoxy group or halogen binding to the silicon atoms of the silane compound (a) and the silane compound (b).

By stirring a mixture of the silane mixture and water, the alkoxy group or the halogen atom binding to a silicon atom is hydrolyzed to produce a hydroxysilyl group.

From the viewpoint of enhancing the hydrolysis, a catalyst is preferably used.

Examples of the catalyst used for the hydrolysis include acids such as hydrochloric acid, sulfuric acid, phosphoric acid, citric acid, and acetic acid; bases such as NaOH, KOH, and ammonia; and inorganic salts such as KF and NaF. Among these catalysts, from the viewpoint of a reduction in the amount of remaining catalyst, a volatile catalyst, such as hydrochloric acid, acetic acid, or ammonia, tends to be preferred. Incidentally, the catalyst used for the hydrolysis reaction also serves as a catalyst for a condensation reaction between the resulting hydroxysilyl group and a functional group, such as a silanol group, of the base material surface and a condensation reaction between the resulting hydroxysilyl groups.

The addition amount of the catalyst is usually in the range of 0.1 to 100 wt %, preferably 0.3 to 50 wt %, and further preferably 0.5 to 20 wt % of the total weight of the silane compound (a) and the silane compound (b).

The hydrolysis of an alkoxysilyl group and a halogenosilyl group usually progresses at room temperature, but it may be performed under heating, according to need, for accelerating the rate of the hydrolysis. However, heating to a temperature of too high, for example, near 100° C. causes a heat-hardening reaction between the hydroxysilyl groups produced by the hydrolysis, resulting in, in a short amount of time, gelation of the silane mixture of which main components are the silane compound (a) and the silane compound (b). This often causes a problem that the application to a base material is impossible.

Therefore, from the viewpoint of pot life of a mixture formed from the silane mixture and water, the hydrolysis temperature is usually in the range of 0 to 50° C., preferably in the range of 10 to 40° C., and further preferably in the range of 20 to 30° C.

A layer (hardened material layer) of which main component is silica is formed by thus applying the mixture of the silane mixture and water to a base material and further promoting the condensation reaction.

The hardened material layer includes a mercapto group, an amino group, a (meth)acryloyl group, or a vinyl group derived from the silane compound (a).

The hydrophilic film of the present invention is obtained by applying the hydrophilic compound (c) to the hardened material layer obtained as in above and performing a reaction between a mercapto group, an amino group, a (meth) acryloyl group, or a vinyl group derived from the silane compound (a) and the acryloyl group of the hydrophilic compound (c) by means of, for example, heat or radiation rays.

The application of the hydrophilic compound (c) to the hardened material layer may be conducted by applying the hydrophilic compound (c) only. However, since the hydrophilic compound (c) includes a potassium sulfonate group, the crystallinity is high, and the workability may be low in some compounds.

Therefore, the application of the hydrophilic compound (c) to the hardened material layer may be carried out by preparing a solution in which a hydrophilic compound is dissolved in a solvent (hereinafter, also referred to as a hydrophilic compound solution (c')), applying the hydrophilic compound solution (c') to the hardened material film, and, after drying, performing a reaction (grafting) by means of heat or radiation rays.

Examples of the solvent used for the preparation of the hydrophilic compound solution (c') include alcohols such as methanol, ethanol, isopropanol (IPA), n-butanol, and methoxyethanol; aprotic polar solvents such as acetonitrile, DMF, and DMSO; water; and solvent mixtures thereof.

Among these solvents, alcohols such as methanol, ethanol, isopropanol (IPA), n-butanol, and methoxyethanol; water; and solvent mixtures thereof are preferred. The amount of the solvent used is arbitrarily determined depending on the type of the solvent.

Furthermore, the hydrophilic compound solution (c') preferably includes, for example, a catalyst and a polymerization initiator, from the viewpoint of enhancing the reactivity with the mercapto group derived from the silane compound (a) contained in the hardened material layer.

However, the catalyst and the polymerization initiator are slightly modified depending on the hardening process (heat or radiation rays).

Examples of the catalyst used when the reaction (grafting) is carried out by means of heat include basic catalysts, for example, tertiary amines such as triethylamine, pyridine, N-methylmorpholine, and triethylenediamine; alkali metal alkoxides such as sodium methoxide and t-butoxy potassium; inorganic bases such as sodium hydroxide, potassium hydroxide, and potassium carbonate.

Examples of the polymerization initiator used when the reaction (grafting) is carried out by means of radiation rays include Esacure KT55 (Lamberti Co., Ltd.), EsacureKTO46 (Lamberti Co., Ltd.), Irgacure 184 (Ciba Speciality Chemicals Inc.), Irgacure 1173 (Ciba Speciality Chemicals Inc.), Irgacure 500 (Ciba Speciality Chemicals Inc.), Irgacure 819 (Ciba Speciality Chemicals Inc.), and Darocure TPO (Ciba Speciality Chemicals Inc.), and other publicly known UV radical polymerization initiators.

The addition amount of the catalyst or the polymerization initiator that is added for accelerating the reaction (grafting) with the reactive group derived from the silane compound (a) present in the hardened material layer is usually in the range of 0.1 to 100 wt %, preferably 0.3 to 30 wt %, and more preferably 1 to 10 wt % of the hydrophilic compound (c).

The hydrophilic compound solution (c') may further contain an additive.

Examples of the additive include a polymerization accelerator, an UV absorber, an infrared absorber, a hindered amine light stabilizer (HALS), a radical scavenger, an antioxidant, a polymerization inhibitor, a pigment, a metal deactivator, a storage stability enhancer, a pigment, a dye, a bulking agent, a filler, and a binder. The additive can be contained in the range that does not impair the reactivity (grafting) with the hardened material layer of which main component is silica.

The hydrophilic film of the present invention is formed by that the reaction (grafting) described above is carried out by applying the hydrophilic compound (c) or the hydrophilic compound solution (c') to the hardened material layer and thereby that the hydrophilic compound (c) binds to the surface of the hardened material layer.

<Application Process and Method of Use>

The hydrophilic film of the present invention forms a hardened material layer having a mercapto group, an amino group, a (meth)acryloyl group, or a vinyl group derived from the silane compound (a) on a surface of a base material by, first, applying a solution containing the silane mixture described above and, according need, water and a hydrolysis catalyst to the base material surface, and then conducting heat hardening. The base material is, for example, an organic base material such as PMMA, polycarbonate (PC), PET, ABS, vinyl chloride, polyethylene (PE), polypropylene (PP), or polylactic acid; a metal such as iron, stainless steel, aluminum, nickel, zinc, gold, silver, or copper; a base material having a surface plated with a metal mentioned above; an oxide of a metal mentioned above; or an inorganic material such as glass, ceramics, cement, a slate, stone material such as marble and granite, or mortar (which means a base material of which surface coming into contact with the silica layer of the present invention is made of an inorganic base material represented by the materials mentioned above).

Then, the hydrophilic compound (c) or the hydrophilic compound solution (c') is applied onto the thus formed hardened material layer, followed by drying. Subsequently, a reaction (grafting) is caused by means of heat or radiation rays to form covalent bonds between at least a part of the mercapto groups, the amino groups, the (meth)acryloyl groups, or the vinyl groups present on the surface of the hardened material layer and at least a part of the acryloyl groups of the hydrophilic compound (c). Then, the reaction (grafting) surface is washed with, for example, water to remove the surplus hydrophilic compound (c) and so on to obtain a transparent hydrophilic film of the present invention.

Thus, a laminate in which a hydrophilic film excellent in hydrophilicity due to the component (c) is formed on a base material is obtained by forming the hydrophilic film of the present invention by a reaction (grafting) caused by application of the hydrophilic compound (c) or the hydrophilic compound solution (c') onto the hardened material layer, of which main component is silica, formed on the base material surface.

By the above-described series of manipulations, the base material and a component derived from the hydrophilic compound (c) are tightly unified with the hardened material layer of which main component is silica formed from the silane mixture.

It is supposed that such tight unification is achieved by that the base material and the hardened material layer are tightly unified by hydrolyzing and condensating a silane mixture containing the silane compound (a) and the silane compound (b) on a base material and thereby to form a covalent bond or a strong interaction through a reaction (for example, dehydration condensation cross-linking reaction by a siloxane bond) between the hydroxysilyl groups or between the hydroxysilyl group and a functional group which may remain on the base material surface, and further that the hardened material layer and the hydrophilic compound (c) are tightly unified by forming a covalent bond through the reaction (grafting).

Among the base materials mentioned above, inorganic base materials are relatively preferred from the viewpoint of that they are easily increased in adhesion.

Among the inorganic base materials, preferred are inorganic base materials having surfaces formed of, for example, glass, a metal, a plated metal, a metal oxide, or ceramics; more preferred are inorganic base materials having surfaces formed of glass, a metal, a metal oxide, or ceramics; and further preferred are inorganic base materials having surfaces formed of glass.

In addition, the base material may be subjected to surface treatment for enhancing adhesion, before the formation of the hardened material layer from the silane mixture. Examples of the surface treatment include physical treatment such as corona treatment, flame treatment, plasma treatment, ozone treatment, low-temperature plasma treatment using, for example, oxygen gas or nitrogen gas, and glow discharge treatment; and chemical treatment such as oxidation treatment with an oxidant and etching treatment with an acid or an alkali.

Furthermore, it is preferred to thoroughly wash the surface in advance for removing extraneous matter from the surface, before forming the hardened material layer from the silane mixture, from the viewpoint of increasing the adhesion between the base material surface and the hardened material layer. Incidentally, surface pollution of the base material can be simply measured by, for example, measuring the water contact angle.

Examples of pollutants adhering to the base material surface include sebum, fat and oil, silicone, plasticizers bleeding from packaging and so on, and ambient hydrophobic substances dispersed from exhaust gas and the like and floating in the air. Many of these substances are hydrophobic.

Therefore, in many cases, the polluted surface of an inorganic base material is different from the hydrophilic properties that are originally imparted to the base material. The thus polluted surface of the inorganic base material tends to shed the "silane solution" of the present invention applied thereto. As a result, since a uniform reactive silica layer (hardened film layer) is not formed, the adhesion of the interface between the base material surface and the reactive silica layer tends to be decreased. In addition, the reactive silica layer is formed on the adhering pollutants, resulting in a further reduction in adhesion of the interface between the base material surface and the reactive silica layer.

Among the base materials mentioned above, inorganic base materials are easily polluted. Furthermore, among the inorganic base materials, the glass surface particularly tends to be polluted. For example, glass is easily polluted with, for example, silicone from packaging materials and scratch protection sheets and hydrophobic substances floating in the air. Essentially, glass has very high hydrophilicity, and the water contact angle thereof is thought to be 5° (Hyomen kagaku (surface science), vol. 22, pp. 55-63, 2001). However, purchased glass usually has a water contact angle of 50 to 70° and is thus heavily polluted.

Therefore, when purchased glass is directly used, it is difficult to ensure sufficient adhesion even if the hydrophilic film of the present invention is laminated, and, in addition, there is a tendency that sufficient adhesion is hardly obtained even if the glass is subjected to ultrasonic cleaning in water (water contact angle: 25 to 35°). In order to ensure sufficient adhesion with a glass surface, the glass surface preferably has at least a water contact angle of 15° or less, more preferably 10° or less.

That is, in order to sufficiently ensure adhesion with the base material surface, it is important to remove pollutants on the surface. As an index of the removal, there is a tendency that the water contact angle is preferably in the range of ±10°, more preferably in the range of ±5°, of the essential water contact angle of the base material surface.

Examples of the method for applying the solution containing the silane mixture to a base material surface or the method for applying the hydrophilic compound (c) or the hydrophilic compound solution (c') to the above-described hardened material layer used in the present invention include brush coating, spray coating, wire bar coating, bar coater coating, blade coating, roll coating, spin coating, dipping, and other known coating methods.

The solution containing the silane mixture to be applied to the base material usually contains a compound having hydroxy groups converted by hydrolysis of at least a part of the silicon-bonded alkoxy or halogen groups derived from the silane compound (a) and the silane compound (b). By heating the compound, a layer (also referred to as a hardened material layer or a reactive silica layer) is formed by hardening through dehydration condensation between the silicon-bonded hydroxy groups, dehydration condensation between the hydroxy group of the surface of the base material such as glass and the silicon-bonded hydroxy group, and further hydrolysis of the residual silicon-bonded alkoxy or halogen groups by generated water, and further occurring dehydration condensation reactions.

The heating may also cause drying for distilling away the solvent and is usually conducted in a temperature range of from ordinary temperature to 200° C. for 0.01 to 240 hours.

From the viewpoint of reducing the hardening time, a heating temperature is preferably high to a certain extent. Accordingly, the heating is usually conducted at 50 to 180° C. for 1 to 480 minutes, preferably at 80 to 150° C. for 5 to 240 minutes, more preferably at 100 to 130° C. for 10 to 180 minutes or at 140 to 180° C. for 5 to 120 minutes. However, when the heating temperature is too high, cooling will take a large amount of time, which may, conversely, decrease productivity.

The heating may be conducted under the atmosphere or under an atmosphere of inert gas such as nitrogen, but the heating under the atmosphere is convenient and is therefore preferred. In addition, the heating may be conducted under the atmospheric pressure or under reduced pressure, but the heating under the atmospheric pressure is convenient and is therefore preferred.

The thickness of the hardened material layer, of which main component is silica, thus laminated on the base material surface is arbitrarily determined according to the object and the base material and is usually in the range of 0.001 to 20 μm, preferably in the range of 0.005 to 10 μm, and more preferably in the range of 0.01 to 5 μm.

The hydrophilic film of the present invention can be formed on a base material by applying the hydrophilic compound (c) or the hydrophilic compound solution (c') (grafting solution) onto the resulting hardened material layer and thereby to cause a reaction (grafting reaction).

The grafting reaction is usually performed by means of, for example, heat or radiation rays, as in the reaction for forming the hardened material layer. However, the grafting in the cases that the hydrophilic compound (c) is a compound having a potassium sulfonate group (hydrophilic compound (c1)) or a compound having a metal sulfonate group other than a potassium sulfonate group or sulfonic acid (hydrophilic compound (c2)) is preferably performed by the respective modes described below.

When the hydrophilic compound (c) is the hydrophilic compound (c1) or when the hydrophilic compound solution (c') contains the hydrophilic compound (c1), the grafting is preferably performed by heating or radiation, as described above, or may be performed by both heating and radiation.

The reaction (grafting) by means of heat may also function so as to distil away the solvent contained in the hydrophilic compound solution (c').

The heating is usually conducted in a temperature range of from ordinary temperature to 200° for 0.01 to 240 hours.

From the viewpoint of reducing the reaction time of the grafting, it is preferred that the heating temperature is high to a certain extent. Accordingly, the heating is usually conducted at 50 to 180° C. for 1 to 480 minutes, preferably at 80 to 150° C. for 5 to 240 minutes, and more preferably at 100 to 130° C. for 10 to 180 minutes. However, when the heating temperature is too high, cooling will take a large amount of time, which may, conversely, decrease productivity.

Usually, the heating is conveniently conducted under the atmosphere. However, when it is required to strictly prevent the rate of a reaction between a mercapto group derived from the compound (a) and an acryl group of the hydrophilic compound (c) from being reduced by oxidation of the mercapto group (—SH into —S—S—), the heating is preferably conducted under an inert gas atmosphere. The reaction (grafting) may be performed under increased pressure, under atmospheric pressure, or under reduced pressure, but atmospheric pressure is convenient and is therefore preferred.

The reaction of the hydrophilic compound (c) by means of radiation rays can be performed under the atmosphere or under an atmosphere of inert gas such as nitrogen. Though the reaction under an inert gas atmosphere is cumbersome and requires a complicated apparatus, the reaction (grafting) time can be shortened and the irradiation energy of radiation rays can be reduced.

Examples of the radiation rays include energy rays having wavelengths in the range of 0.0001 to 800 nm, such as α-rays, β-rays, γ-rays, X-rays, electron-rays, ultraviolet rays, and visible light.

These radiation rays can be arbitrarily selected depending on, for example, the type of the hydrophilic compound (c).

Among the radiation rays, ultraviolet rays having a wavelength in the range of 200 to 450 nm are preferred, ultraviolet rays having a wavelength in the range of 370 to 445 nm are more preferred, ultraviolet rays having a wavelength in the range of 370 to 430 nm are further preferred, and ultraviolet rays having a wavelength in the range of 370 to 400 nm are particularly preferred. When ultraviolet rays having a wavelength in the range mentioned above are used, troubles such as thermal deformation during the reaction (grafting) are reduced, and the reaction (grafting) can be completed within a relatively short time even if a UV absorber is used.

On the other hand, when the hydrophilic compound (c) is the hydrophilic compound (c2) or the hydrophilic compound solution (c') contains the hydrophilic compound (c2), the grafting reaction is preferably accelerated by heating. This is because that when the grafting reaction is conducted by means of radiation rays only without using heat, the rate of reaction between a mercapto group, an amino group, a (meth)acryloyl group, or a vinyl group derived from the compound (a) and an acryl group in the hydrophilic compound (c) is low, and the hydrophilic film may not be provided with sufficient hydrophilicity.

The temperature of the heat is preferably 130° C. or higher, more preferably 130 to 190° C., and further preferably 140 to 180° C. in order to efficiently perform the reaction and reduce unreacted materials. When the temperature of the heat is lower than 130° C., the grafting reaction may not sufficiently progress, and thereby the hydrophilic film may not be provided with sufficient hydrophilicity. In addition, the heating time is usually in the range of 0.01 to 240 hours.

When the hydrophilic compound (c) is the hydrophilic compound (c2), or the hydrophilic compound solution (c') contains the hydrophilic compound (c2), the silane compound (b) is preferably a silane compound represented by the above-mentioned formula (b1) or (b2). The silane compound represented by the formula (b1) is slightly more preferred than that represented by the formula (b2).

Among the silane compounds represented by the formula (b1), those in which the total number of carbon atoms in one molecule is 12 or less are more preferred, and examples such a silane compound include tetramethoxy-silane, tetraethoxy-silane, hydroxy-triethoxysilane, dihydroxy-diethoxy-silane, trihydroxy-ethoxy-silane, tetrahydroxy-silane, tetrachloro-silane, tetra-n-propoxy-silane, and tetra-isopropoxy-silane.

Similarly, among the silane compounds represented by the formula (b2), those in which the total number of carbon atoms in one molecule is 1 to 20 are more preferred, and examples such a silane compound include bis(trimethoxysilyl)methane, bis(triethoxysilyl)methane, bis(trihydroxysilyl)methane, 1,2-bis(trimethoxysilyl)ethane, 1,2-bis(triethoxysilyl)ethane, 1,2-bis(tri-n-propoxysilyl)ethane, bis(triisopropoxysilyl)ethane, 1,2-bis(trichloro)ethane, 1-(hydroxy-diethoxy-silyl)-2-(triethoxy-silyl)ethane, 1,2-bis(hydroxy-diethoxy-silyl)ethane, 1-(dihydroxy-ethoxy-silyl)-2-(hydroxy-diethoxy-silyl)ethane, 1,2-bis(dihydroxy-ethoxy-silyl)ethane, 1,2-bis(trihydroxysilyl)ethane, 1,3-bis(trimethoxysilyl)propane, 1,4-bis(trimethoxysilyl)butane, 1,6-bis(trimethoxysilyl)hexane, and 1,8-bis(trimethoxysilyl)octane.

In the film thus formed from a component derived from the hydrophilic compound (c) on the surface of the hardened material layer, it is anticipated that most of the molecules forming the film are bonded to the hardened material layer in a monomolecular form and that a small amount of the molecules are bonded to the hardened material layer as a polymer of the hydrophilic compound (c). Therefore, the thickness of the film is estimated to be in the range of 0.001 to 0.5 μm. It is anticipated that a longer chain of the polymer derived from the hydrophilic compound (c) formed by the reaction (grafting) decreases the abrasion resistance. Therefore, from these viewpoints, it is anticipated that the thickness of the film formed from a component derived from the hydrophilic compound (c) is preferably in the range of 0.001 to 0.1 μm and more preferably in the range of about 0.001 to 0.01 μm.

Thus, a laminate in which a hydrophilic silica layer to which the hydrophilic compound, the compound (c), is bonded is firmly attached to the surface of a base material is obtained.

The laminate obtained by the present invention may be a film, a sheet, or a molded product. The laminate obtained by the present invention is high in hydrophilicity and abrasion resistance and therefore can be suitably used as an anti-clouding material, a pollution-preventing (self-cleaning) material, an antistatic material, a quick-drying material, and so on. For example, the laminate is used as a coating material for, for example, outer walls, exteriors, inner walls, interiors, and floors of a building, a ship, an airplane, or a vehicle.

In addition, the laminate obtained by the present invention can be used as a coating material for clothing materials such as clothes, fabrics, and fiber; optical articles such as optical films, optical disks, glasses, contact lenses, and goggles; displays and display materials such as flat panels and touch panels; glass substrates of solar cells or transparent protective plates of outermost layers of solar cells; lighting articles such as lamps and lights and their lighting members; cooling fins such as heat exchangers, cosmetic containers and container materials, reflective materials such as reflective films and reflective plates, sound-insulating boards that are placed along expressways or the like, window glass, mirror, furniture, furniture materials, bathroom materials, kitchen materials, ventilating fans, plumbing, wiring, electric appliances, and electric parts.

The laminate of the present invention, in accordance with the intended use, may be subjected to surface treatment, e.g., physical treatment such as corona treatment, flame treatment, plasma treatment, ozone treatment, low-temperature plasma treatment using oxygen gas, nitrogen gas, or the like, or glow discharge treatment, or chemical treatment such as oxidation treatment with an oxidant or the like or etching treatment with an acid, an alkali, or the like, or may be laminated with an inorganic material such as ITO or silica or an organic material such as a resin by further coating another hydrophilic compound (c) or a "grafting solution" containing the another hydrophilic component (c).

EXAMPLES

The present invention will be more specifically described with reference to Examples and Comparative Examples below, but is not limited to the following Examples. Furthermore, in the present invention, physical property evaluations of hydrophilic films and laminates were performed by the following methods.

<Water Contact Angle>

The water contact angle was measured using model CA-V manufactured by Kyowa Interface Science Co., Ltd. at room temperature (25° C.)

<Steel Wool Abrasion Test-1>

Rubbing with steel wool #0000 under a load of 0.1 Kgf was conducted 10 cycles. The results were evaluated by visually counting scratches and were determined as ○ when no scratches were observed, Δ when ten or less scratches were observed, and X when over ten scratches were observed.

<Steel Wool Abrasion Test-2>

Rubbing with steel wool #0000 under a load of 2 Kgf was conducted 10 cycles. The results were evaluated by visually counting scratches and were determined as ○ when no scratches were observed, Δ when ten or less scratches were observed, and X when over ten scratches were observed.

<Cross-Cut Test>

Cutting in a grid pattern at 3 mm intervals (25 squares in total) was produced using a cutter knife or cutter guide. Then, adhesive cellophane tape (Cellotape (registered trademark) with a width of 24 mm, a product of Nichiban Co., Ltd.) was attached to the grid pattern in such a manner that no air is contained, and was rubbed with a finger so that the adhesive tape completely adheres thereto. Lastly, the tape was instantaneously peeled off in the direction perpendicular to the adhesion plane. The results were evaluated by visually counting squares not be peeled off, and showed as the numbers converted for 100 squares.

Example 1

Washing of Base Material

A glass plate (surface water contact angle: 57 to 70°) with a thickness of 2 mm was used as a base material and, first, was washed according to the following procedure.

Water was dropped on a surface of the glass plate 2 mm in thickness, and the glass plate (surface water contact angle: 57 to 70°) was washed by rubbing with a cloth (Bemcot M-3, a production of Asahi Kasei Corp.) moistened with a suitable amount of a glass washing agent (High Shine HS-ordinary white: a product of Pionchemical Corp.). Subsequently, the abrasive was mostly washed away from the glass plate surface with water. Then, water was dropped on the surface of the glass plate, and the glass plate was washed by rubbing with another cloth (Bemcot M-3, a production of Asahi Kasei Corp.), and the abrasive was completely washed away from the glass plate surface with water. Lastly, the glass plate was dried using an air gun. The water contact angle of the glass plate after the washing was 5 to 6° at any spot.

(Preparation of Solution Containing Silane Mixture (Silane Solution (1)))

A uniform solution (silane mixture) was prepared by mixing 3.3 g (17 mmol) of 3-mercaptopropyl-trimethoxysilane (hereinafter, abbreviated to MPMOS, molecular weight: 196.3) as a silane compound (a), 12.7 g (83 mmol) of tetramethoxysilane (hereinafter, abbreviated to TMOS, molecular weight: 152.2) as a silane compound (b), and 400 mL of ethanol (specific gravity: 0.79). To this uniform solution, 10.4 g of 5 wt % sulfuric acid aqueous solution (5 mmol of sulfuric acid and 548 mmol of water) was added. Then, the mixture was stirred at room temperature for 10 minutes to give 342.4 g of a solution (silane solution (1)) containing a uniform silane mixture having 5 wt % solid content concentration. Here, the molar ratio of MPMOS/TMOS in the silane solution (1) was 1/5, the amount of sulfuric acid was 3 wt % (based on the total amount of MPMOS and TMOS), and the amount of water was 1.8 molar times (based on alkoxy groups binding to silicon atoms).

(Preparation of Hydrophilic Compound Solution (1))

A mixture solution was first prepared by mixing 2.5 g (10.8 mmol) of potassium 3-sulfopropyl acrylate (hereinafter, abbreviated to SPA-K, molecular weight: 232.3) as a hydrophilic compound (c) and 130 mL of 2-methoxyethanol (specific gravity: 0.96). To this mixture solution, 0.75 g (7.4 mmol, 69 mol % based on SPA-K, 31 wt % based on SPA-K) of triethyl amine (hereinafter, abbreviated to TEA, molecular weight: 101.2) was added as a catalyst, and the mixture was well mixed to give 128 g of a solution (hydrophilic compound solution (1)) having 2 wt % solid content concentration.

(Formation of Hardened Material Layer)

The solution (silane solution (1)) containing the silane mixture was applied to a surface of a glass plate (water contact angle: 5 to 6°) washed as in above with a bar coater #10, followed by pre-drying at 50° C. for 5 minutes and then heat drying at 120° C. for 1 hour. With this procedure, a hardened material layer of which main component is silica and having a mercapto group derived from the silane compound (a) was formed. The thickness of the hardened material layer was about 0.5 μm, and the surface of the hardened material layer had a water contact angle of 46°.

(Grafting)

The hydrophilic compound solution (1) was applied to the hardened material layer surface with a bar coater #10, followed by pre-drying at 50° C. for 5 minutes and then heat drying at 120° C. for 1 hour. With this procedure, SPA-K reacted (grafted) with the mercapto group present in the hardened material layer. After being cooled to room temperature, SPA-K not involved in the reaction (grafting) was washed out with water, and drying with an air gun was conducted. The resulting film was excellent in hydrophilicity, was transparent, did not have tackiness, and was firmly attached to the glass plate. The evaluation results of the film are shown in Table 2.

Examples 2 to 7 and Reference Example 1

Films were formed on glass plates as in Example 1 except that the blending molar ratio of MPMOS/TMOS in the silane solution (1) was modified as shown in Table 2, and were subjected to the tests. The evaluation results of the films are shown in Table 2.

TABLE 2

| | MPMOS/TMOS (molar ratio) | SH value[1] (meq/g) | Water contact angle before grafting | Grafting compound | Water contact angle after grafting | Appearance | Adhesion* | Abrasion 1** | Abrasion 2*** | Grafting process |
|---|---|---|---|---|---|---|---|---|---|---|
| Example 1 | 1/5 | 1.04 | 46 | 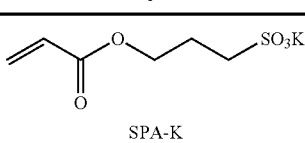 SPA-K | <5 | transparent | 100/100 | ○ | ○ | heat |
| Example 2 | 1/3 | 1.53 | 65 | ↑ | <5 | ↑ | ↑ | ○ | x | ↑ |
| Example 3 | 1/4 | 1.24 | 56 | ↑ | <5 | ↑ | ↑ | ○ | ○ | ↑ |
| Example 4 | 1/9 | 0.64 | 46 | ↑ | 5 | ↑ | ↑ | ○ | ○ | ↑ |
| Example 5 | 1/20 | 0.31 | 34 | ↑ | 6 | ↑ | ↑ | ○ | ○ | ↑ |
| Example 6 | 1/50 | 0.13 | 27 | ↑ | 6 | ↑ | ↑ | ○ | ○ | ↑ |
| Example 7 | 1/100 | 0.06 | 19 | ↑ | 6 | ↑ | ↑ | ○ | ○ | ↑ |

TABLE 2-continued

| | MPMOS/TMOS (molar ratio) | SH value[1] (meq/g) | Water contact angle before grafting | Grafting compound | Water contact angle after grafting | Appearance | Adhesion* | Abrasion 1** | Abrasion 2*** | Grafting process |
|---|---|---|---|---|---|---|---|---|---|---|
| Reference Example 1 | 1/1 | 2.87 | 62 | ↑ | <5 | ↑ | ↑ | x | x | ↑ |

*cross-cut test
**steel wool #0000 × 0.1 kg × 10 cycles
***steel wool #0000 × 2 kg × 10 cycles
[1] the equivalent number of SH contained in 1 g of a mixture of component (a) and component (b)

Comparative Example 1 and Reference Examples 2 to 10

Films were formed on glass plates as in Example 1 except that the blending molar ratio of MPMOS/TMOS in the silane solution (1) was modified and, further, that the type of the hydrophilic compound (c) grafted to the surface of the hardened material layer was modified, as shown in Table 3, and were subjected to the tests. The evaluation results of the films are shown in Table 3.

Comparative Example 2

Formation of Hardened Material Layer

A glass plate was washed as in Example 1 so that the glass plate after the washing had a water contact angle of 5 to 6°. To this glass plate, an isopropyl alcohol solution (silane solution (2)) containing 0.5 wt % 3-mercaptopropyl trimethoxysilane (MPMOS) was applied by spraying, followed by pre-drying at 50° C. for 5 minutes and then heat drying at 120° C. for 1 hour. Then, after being cooled to room temperature, the hardened material layer was washed

TABLE 3

| | MPMOS/TMOS (molar ratio) | SH value[1] (meq/g) | Grafting compound | Water contact angle after grafting | Appearance | Adhesion* | Abrasion 1** | Abrasion 2*** | Grafting process |
|---|---|---|---|---|---|---|---|---|---|
| Comparative Example 1 | 1/0 | 5.09 | 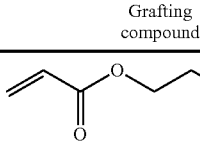 SPA-Na | 16 | transparent | 100/100 | x | x | heat |
| Reference Example 2 | 1/1 | 2.87 | ↑ | 15 | ↑ | ↑ | x | x | ↑ |
| Reference Example 3 | 1/3 | 1.53 | ↑ | 17 | ↑ | ↑ | ○ | x | ↑ |
| Reference Example 4 | 1/5 | 1.04 | ↑ | 19 | ↑ | ↑ | ○ | ○ | ↑ |
| Reference Example 5 | 1/9 | 0.64 | ↑ | 15 | ↑ | ↑ | ○ | ○ | ↑ |
| Reference Example 6 | 1/0 | 5.09 | 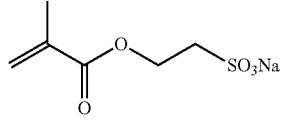 MS-2N | 35 | ↑ | ↑ | x | x | ↑ |
| Reference Example 7 | 1/1 | 2.87 | ↑ | 47 | ↑ | ↑ | x | x | ↑ |
| Reference Example 8 | 1/3 | 1.53 | ↑ | 44 | ↑ | ↑ | ○ | x | ↑ |
| Reference Example 9 | 1/5 | 1.04 | ↑ | 40 | ↑ | ↑ | ○ | ○ | ↑ |
| Reference Example 10 | 1/9 | 0.64 | ↑ | 31 | ↑ | ↑ | ○ | ○ | ↑ |

*cross-cut test
**steel wool #0000 × 0.1 kg × 10 cycles
***steel wool #0000 × 2 kg × 10 cycles
[1] the equivalent number of SH contained in 1 g of a mixture of component (a) and component (b)

with acetone, followed by drying with an air gun. The glass plate laminated with the hardened material layer was slightly cloudy before the washing with acetone, but was returned to transparent by the washing with acetone. Thus, no significant changes in the appearance and the anti-reflective characteristics were observed in the glass plate. The thickness of the hardened material layer was about 0.5 μm, and the surface of the hardened material layer had a water contact angle of 58°. Thus, formation of the hardened material layer of MPMOS was confirmed.

(Preparation of Hydrophilic Compound Solution (2))

Sodium 2-sulfoethyl methacrylate (25.0 g, antox MS-2N, a product of Nippon Nyukazai Co., Ltd.) was tried to be dissolved in 250 g of methanol at room temperature, but was not dissolved (antox MS-2N concentration: 9.1 wt %).

Accordingly, 460 g of methanol was further added thereto for dissolution (antox MS-2N concentration: 3.4 wt %), followed by addition of 0.8 g (3 wt % based on antox MS-2N) of 1-hydroxy-cyclohexyl-phenyl ketone (Irgacure 184, a product of Ciba Speciality Chemicals Inc.) as a photoinitiator. The mixture was stirred for 30 minutes under light-shielding conditions for dissolution.

(Grafting)

The glass plate provided with the hardened material layer of MPMOS was immersed in the resulting hydrophilic compound solution (2) at room temperature for 3 minutes and was then pulled up and held in a nitrogen box for 3 minutes (at room temperature) and irradiated with ultraviolet rays (under the atmosphere) from an ultraviolet light source, a metal halide lamp (output: 120 W/cm$^2$), at distance of 20 cm for 40 seconds for reaction of a methacrylate group and a mercapto group. The glass plate irradiated with ultraviolet rays was washed with pure water and then dried using an air gun.

The resulting film formed on the glass plate was subjected to the same tests as in Example 1. It was confirmed that no significant difference was observed in appearance of the film surface, that the water contact angle of the surface was 16°, and that the hydrophilic antox MS-2N was fixed to the surface of the glass plate. The evaluation results are shown in Table 4.

Reference Examples 11 to 14

Films were formed on glass plates as in Comparative Example 2 except that TMOS was added to the silane solution (2) and that blending molar ratio of MPMOS/TMOS was modified, as shown in Table 4, in the formation of the hardened material layer, and were subjected to the tests. The evaluation results of the films are shown in Table 4.

TABLE 4

| | MPMOS/TMOS (molar ratio) | SH value[1] (meq/g) | Grafting compound | Water contact angle after grafting | Appearance | Adhesion* | Abrasion 1** | Abrasion 2*** | Grafting process |
|---|---|---|---|---|---|---|---|---|---|
| Comparative Example 2 | 1/0 | 5.09 | 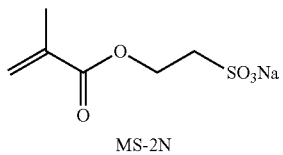 MS-2N | 16 | transparent | 100/100 | x | x | UV |
| Reference Example 11 | 1/1 | 2.87 | 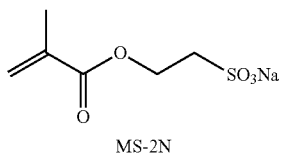 MS-2N | 26 | ↑ | ↑ | x | x | ↑ |
| Reference Example 12 | 1/3 | 1.53 | 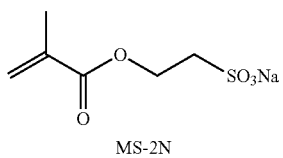 MS-2N | 34 | ↑ | ↑ | ○ | x | ↑ |
| Reference Example 13 | 1/5 | 1.04 | 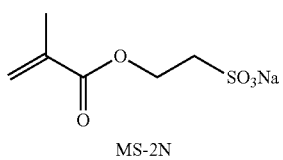 MS-2N | 32 | ↑ | ↑ | ○ | ○ | ↑ |

TABLE 4-continued

| | MPMOS/TMOS (molar ratio) | SH value[1] (meq/g) | Grafting compound | Water contact angle after grafting | Appearance | Adhesion* | Abrasion 1** | Abrasion 2*** | Grafting process |
|---|---|---|---|---|---|---|---|---|---|
| Reference Example 14 | 1/9 | 0.64 | 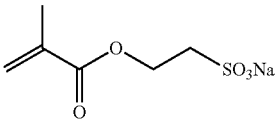<br>MS-2N | 38 | ↑ | ↑ | ○ | ○ | ↑ |

*cross-cut test
**steel wool #0000 × 0.1 kg × 10 cycles
***steel wool #0000 × 2 kg × 10 cycles
[1]SH value of silane solution before hardening Example 8 and Comparative Examples 3 and 4

Films were formed on glass plates as in Example 1 except that the type of the hydrophilic compound (c) to be grafted to the surface of the hardened material layer was modified as shown in Table 5 and, further, that the hydrophilic compound (c) was grafted to the surface of the hardened material layer under the same heat grafting conditions as in Example 1 or under the same UV grafting conditions as in Comparative Example 3.

Furthermore, the films obtained by heat grafting or UV grafting were subjected to the same tests as in Example 1. The evaluation results of the films are shown in Table 5.

Incidentally, the film obtained by heat grafting and the film obtained by UV grafting showed the same results in each of the tests for appearance, abrasion 1, abrasion 2, and adhesion.

TABLE 5

| | MPMOS/TMOS (molar ratio) | SH value[1] (meq/g) | Grafting compound | Water contact angle after heat grafting | Water contact angle after UV grafting | Appearance | Abrasion 1** | Abrasion 2*** | Adhesion* |
|---|---|---|---|---|---|---|---|---|---|
| Example 8 | 1/5 | 1.04 | 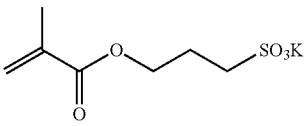<br>SPMA-K | 33 | 45 | transparent | ○ | x | 100/100 |
| Comparative Example 3 | 1/5 | 1.04 | 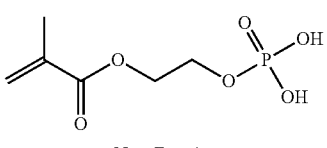<br>New Frontier S-510 | 38 | 31 | ↑ | ○ | ○ | ↑ |
| Comparative Example 4 | 1/5 | 1.04 | 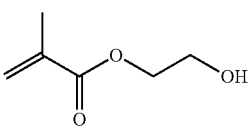<br>HEMA | 37 | 24 | ↑ | ○ | ○ | ↑ |

*cross-cut test
**steel wool #0000 × 0.1 kg × 10 cycles
***steel wool #0000 × 2 kg × 10 cycles
[1]the equivalent number of SH contained in 1 g of a mixture of component (a) and component (b)

Examples 9 to 11

Films were formed on glass plates as in Example 1 except that the type of the hydrophilic compound (c) to be grafted to the surface of the hardened material layer was modified as shown in Table 6, and were subjected to the tests. The results are shown in Table 6.

TABLE 6

| | MPMOS/TEOS (molar ratio) | SH value[1] (meq/g) | Grafting compound | Appearance | Water contact angle | Adhesion* | Abrasion 1** | Abrasion 2*** | Grafting process |
|---|---|---|---|---|---|---|---|---|---|
| Example 9 | 1/5 | 0.81 | 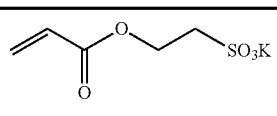 SEA-K | transparent | <5 | 100/100 | ○ | ○ | heat |
| Example 10 | 1/5 | 0.81 | 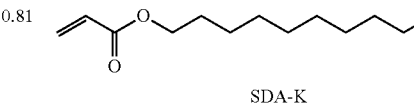 SDA-K | transparent | 7 | 100/100 | ○ | ○ | heat |
| Example 11 | 1/5 | 0.81 | 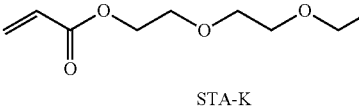 STA-K | transparent | <5 | 100/100 | ○ | ○ | heat |

*cross-cut test
**steel wool #0000 × 0.1 kg × 10 cycles
***steel wool #0000 × 2 kg × 10 cycles
[1] the equivalent number of SH contained in 1 g of a mixture of component (a) and component (b)

Examples 12 to 19

Films were formed on glass plates as in Example 1 except that the hardening conditions of the hardened material layer or the heat grafting conditions of the hydrophilic compound (c) were modified as shown in Tables 7 and 8, and were subjected to the tests. The results are shown in Tables 7 and 8.

TABLE 7

| | MPMOS/TEOS (molar ratio) | SH value[1] (meq/g) | Grafting compound | Appearance | Water contact angle | Adhesion* | Abrasion 1** | Abrasion 2*** | Hardening condition of hardened film layer | Heat grafting condition |
|---|---|---|---|---|---|---|---|---|---|---|
| Example 12 | 1/5 | 0.81 | 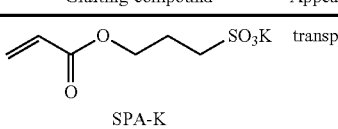 SPA-K | transparent | 4.4 | 100/100 | ○ | ○ | 120° C. for 1 hr | 120° C. for 1 hr |
| Example 13 | 1/5 | 0.81 | 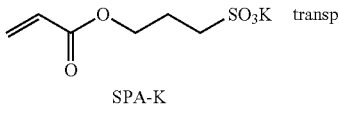 SPA-K | transparent | 4.2 | 100/100 | ○ | ○ | ↑ | 120° C. for 2 hrs |
| Example 14 | 1/5 | 0.81 | 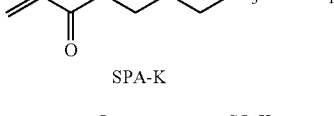 SPA-K | transparent | 3.5 | 100/100 | ○ | ○ | ↑ | 150° C. for 1 hr |
| Example 15 | 1/5 | 0.81 | 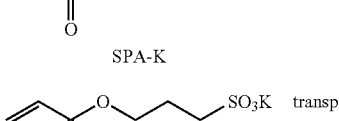 SPA-K | transparent | 3.5 | 100/100 | ○ | ○ | ↑ | 180° C. for 1 hr |
| Example 16 | 1/5 | 0.81 | 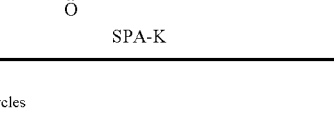 SPA-K | transparent | 4.9 | 100/100 | ○ | ○ | ↑ | 200° C. for 1 hr |

*cross-cut test
**steel wool #0000 × 0.1 kg × 10 cycles
***steel wool #0000 × 2 kg × 10 cycles
1: the equivalent number of SH contained in 1 g of a mixture of component (a) and component (b)

TABLE 8

| | MPMOS/TEOS (molar ratio) | SH value[1] (meq/g) | Grafting compound | Appearance | Water contact angle | Ad-hension* | Abrasion 1** | Abrasion 2*** | Hardening condition of hardened film layer | Heat grafting condition |
|---|---|---|---|---|---|---|---|---|---|---|
| Example 17 | 1/5 | 0.81 | SPA-K | transparent | 4.0 | 100/100 | ○ | ○ | 80° C. for 1 hr | 150° C. for 1 hr |
| Example 18 | 1/5 | 0.81 | SPA-K | transparent | 3.5 | 100/100 | ○ | ○ | 120° C. for 1 hr | ↑ |
| Example 19 | 1/5 | 0.81 | SPA-K | transparent | 4.6 | 100/100 | ○ | ○ | 150° C. for 1 hr | ↑ |

*cross-cut test
**steel wool #0000 × 0.1 kg × 10 cycles
***steel wool #0000 × 2 kg × 10 cycles
1: the equivalent number of SH contained in 1 g of a mixture of component (a) and component (b)

Example 24

Preparation of Silane Solution (3)

In a conical flask with a stopper and equipped with a stirrer, 1.08 g (1.25 mmol) of X-41-1805 (product name of Shin-Etsu Chemical Co., Ltd., mercapto equivalent: 862 g/mol), which is an oligomer-type silane compound prepared by reaction (polycondensation) of MPMOS and tetraethoxysilane at a molar ratio of about 1:4.7, as the silane compounds (a) and (b) and 2.60 g (12.5 mmol) of tetraethoxysilane (TEOS), which is a silane compound (b) component, were weighed, and then 93.5 g of ethanol was added thereto, followed by stirring to prepare a uniform solution. Incidentally, the blending molar ratio of X-41-1805 and TEOS (X-41-1805/TEOS) was 1/10.

To the prepared uniform solution, 2.9 g of 5 wt % sulfuric acid was added, and the mixture was stirred at room temperature for 10 minutes for hydrolysis to give a uniform silane solution (3) having 4 wt % solid content.

(Formation of Hardened Material Layer)

As in Example 1, a hardened film layer having the residual mercapto group derived from X-41-1805 was formed on a surface of a washed glass plate using the silane solution (3).

(Grafting)

The hydrophilic compound solution (1) prepared in Example 1 was applied to the surface of the resulting hardened film layer again with a bar coater #2, and, similarly, SPA-K was grafted to the mercapto group on the surface of the hardened film layer by pre-drying at 50° C. for 5 minutes and subsequent heat drying at 150° C. for 1 hour. After the grafting and being cooled to room temperature, SPA-K not involved in the reaction (grafting) with the mercapto group was washed out with water, and drying with an air gun was conducted. The resulting film was transparent, did not have tackiness, and was firmly attached to the glass plate surface. The film formed on the glass plate was subjected to the same tests as in Example 1 and was further subjected to a taber abrasion test under the conditions and evaluation criteria shown below. The evaluation results are shown in Table 9.

(Taber Abrasion Test)

A sample plate coated on a blue glass plate (10 cm in length, 10 cm in width, and 0.2 cm in thickness) having a hole with an inner diameter of 6 mm at the center was subjected to an abrasion test under the conditions below. Incidentally, the test results shown in Table 9 are each an average value of haze values measured at four spots where an abrasive wheel passed under the following conditions.

(Measurement Conditions)

Test device: "rotary abraser" #2114 008-09, a product of Toyo Seiki Seisaku-sho, Ltd.

Abrasive wheel: "C180-OXF", a product of Daiwa Kasei Co., Ltd.

Load: 500 g (250 g×2)

Measurement device: "Haze Meter NDH 2000", a product of Nippon Denshoku Industries Co., Ltd.

Examples 20 to 23 and 25 to 27

Films were formed on glass plates as in Example 24 except that TMOS was added to the silane solution (3) and that the blending molar ratio of X-41-1805/TMOS was modified, as shown in Table 9, in the formation of the hardened material layer, and were subjected to the tests. The results are shown in Table 9.

Comparative Example 5

A blue glass plate (10 cm in length, 10 cm in width, and 0.2 cm in thickness) serving as the base material was subjected to the same taber abrasion test as in Example 24. The results are shown in Table 9.

TABLE 9

| | X-41-1805/TEOS (molar ratio) | SH value[1] (meq/g) | Grafting compound |
|---|---|---|---|
| Example 20 | 1/0 | 1.16 | SPA-K: $CH_2=CH-C(=O)-O-(CH_2)_3-SO_3K$ |
| Example 21 | 1/0.7 | 0.99 | SPA-K: $CH_2=CH-C(=O)-O-(CH_2)_3-SO_3K$ |
| Example 22 | 1/3 | 0.67 | SPA-K: $CH_2=CH-C(=O)-O-(CH_2)_3-SO_3K$ |
| Example 23 | 1/7 | 0.43 | SPA-K: $CH_2=CH-C(=O)-O-(CH_2)_3-SO_3K$ |
| Example 24 | 1/10 | 0.34 | SPA-K: $CH_2=CH-C(=O)-O-(CH_2)_3-SO_3K$ |
| Example 25 | 1/20 | 0.24 | SPA-K: $CH_2=CH-C(=O)-O-(CH_2)_3-SO_3K$ |
| Example 26 | 1/32 | 0.15 | SPA-K: $CH_2=CH-C(=O)-O-(CH_2)_3-SO_3K$ |
| Example 27 | 1/50 | 0.10 | SPA-K: $CH_2=CH-C(=O)-O-(CH_2)_3-SO_3K$ |
| Comparative Example 5 | — | — | — |

| | Appearance | Water contact angle | Adhension* | Abrasion 1** | Abrasion 2*** | Tabor abrasion test**** | | | Hardening condition | |
|---|---|---|---|---|---|---|---|---|---|---|
| | | | | | | haze before the test | Δ haze after 100 cycles | Δ haze after 250 cycles | of hardened film layer | Heat grafting condition |
| Example 20 | transparent | 3.2 | 100/100 | ○ | × | — | — | — | 120° C. for 1 hr | 150° C. for 1 hr |

TABLE 9-continued

| | | | | | | | | | | |
|---|---|---|---|---|---|---|---|---|---|---|
| Example 21 | transparent | 3.0 | 100/100 | ○ | × | — | — | — | ↑ | ↑ |
| Example 22 | transparent | 3.0 | 100/100 | ○ | ○ | 0.3 | 0.9 | 1.3 | ↑ | ↑ |
| Example 23 | transparent | 2.9 | 100/100 | ○ | ○ | 0.3 | 0.8 | 1.2 | ↑ | ↑ |
| Example 24 | transparent | 2.5 | 100/100 | ○ | ○ | 0.3 | 0.6 | 0.8 | ↑ | ↑ |
| Example 25 | transparent | 2.9 | 100/100 | ○ | ○ | 0.3 | 0.9 | 1.4 | ↑ | ↑ |
| Example 26 | transparent | 3.6 | 100/100 | ○ | ○ | 0.3 | 1.2 | 1.4 | ↑ | ↑ |
| Example 27 | transparent | 3.6 | 100/100 | ○ | ○ | 0.3 | 1.4 | 1.4 | 150° C. for 1 hr | ↑ |
| Comparative Example 5 | Base material: blue glass plate→ | | | | | 0.1 | 1.4 | 1.6 | — | — |

*cross-cut test
**steel wool #0000 × 0.1 kg × 10 cycles
***steel wool #0000 × 2 kg × 10 cycles
****abrasive wheel: C180-OXF, load 250 g × 2
1: the equivalent number of SH contained in 1 g of a mixture of component (a) and component (b)

Examples 28 to 30

Films were formed on glass plates as in Example 24 except that the hardening conditions of the hardened film layer were modified as shown in Table 10, and were subjected to the tests. The results are shown in Table 10.

TABLE 10

| | X-41-1805/ TEOS (molar ratio) | SH value[1] (meq/g) | Grafting compound | Appearance | Water contact angle | Adhension* | Abrasion 1** | Abrasion 2*** | Hardening condition of hardened film layer | Heat grafting condition |
|---|---|---|---|---|---|---|---|---|---|---|
| Example 28 | 1/10 | 0.34 | SPA-K | transparent | 3.8 | 100/100 | ○ | ○ | 80° C. for 1 hr | 150° C. for 1 hr |
| Example 29 | 1/10 | 0.34 | SPA-K | transparent | 2.5 | 100/100 | ○ | ○ | 120° C. for 1 hr | ↑ |
| Example 30 | 1/10 | 0.34 | SPA-K | transparent | 2.6 | 100/100 | ○ | ○ | 150° C. for 1 hr | ↑ |

*cross-cut test
**steel wool #0000 × 0.1 kg × 10 cycles
***steel wool #0000 × 2 kg × 10 cycles
1: the equivalent number of SH contained in 1 g of a mixture of component (a) and component (b)

Example 31

A hardened film layer prepared as in Example 20 and a film prepared by grafting a hydrophilic compound to this hardened film layer were measured for ionic strength of each surface using a time-of-flight secondary ion mass spectrometer (TOF-SIMS) under the following conditions for investigating the functional group concentration of each surface. The results are shown in Table 11.

<Analysis Conditions of Ionic Strength>
Test device: "TOF-SIMS", a product of ION TOF GmbH
Primary ion: $Bi^{3+}$
Accelerating voltage: 25 kV
Analysis region: 500 μm×500 μm

Examples 32 and 33

As shown in Table 11, films were formed on glass plates as in Examples 24 and 26, and ionic strength of each surface was analyzed as in Example 31. The results are shown in Table 11.

TABLE 11

(Ionic strength analysis of surface)

| | X-41-1805/ TEOS (molar ratio) | SH value[1] (meq/g) | Ionic strength** of reactive silica layer surface Grafting compound HS- | Grafting compound | Ionic strength** of hydrophilic film (graft) surface | | Water contact angle |
|---|---|---|---|---|---|---|---|
| | | | | | SO3- | K+ | |
| Example 31 | 1/0 | 1.16 | 0.017 | 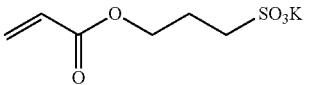 SPA-K | 0.14 | 0.17 | 3.2 |
| Example 32 | 1/10 | 0.34 | 0.024 | 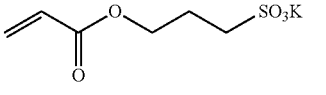 SPA-K | 0.15 | 0.26 | 2.5 |
| Example 33 | 1/32 | 0.15 | 0.014 |  SPA-K | 0.15 | 0.22 | 3.6 |

Note:
the reactive silica hardening was performed at 120° C. for 1 hr, and the grafting was performed at 150° C. for 1 hr.
1: the equivalent number of SH contained in 1 g of a mixture of component (a) and component (b)
**relative value with respect to the total of detected ionic strength: (target ionic strength)/(total ionic strength)

Examples 34 to 37 and Comparative Examples 6 to 12

Films were formed on glass plates as in Example 24 except that the type of the hydrophilic compound (c) to be grafted to the surface of the hardened material layer was modified as shown in Table 12, and were subjected to the tests. The results are shown in Table 12.

Incidentally, in Comparative Example 9, the grafting solution was significantly shedded by the hardened film layer and, thereby, could not be applied to the hardened film layer.

TABLE 12

| | X-41-1805/TEOS (molar ratio) | SH value¹ (meq/g) | Grafting compound | Appearance | Water contact angle | Adhesion* | Abrasion 1** | Abrasion 2*** | Hardening condition of hardened film layer | Heat grafting condition |
|---|---|---|---|---|---|---|---|---|---|---|
| Example 34 | 1/10 | 0.34 | SPA (acrylate with $CH_2SO_3H$) | transparent | 2.9 | 100/100 | ○ | ○ | 120° C. for 1 hr | 150° C. for 1 hr |
| Example 35 | 1/10 | 0.34 | SPA-Na (acrylate with $CH_2SO_3Na$) | transparent | 4.5 | 100/100 | ○ | ○ | ↑ | ↑ |
| Example 36 | 1/10 | 0.34 | SPA-Ca (acrylate with $SO_3(Ca)_{1/2}$) | transparent | 5.9 | 100/100 | ○ | ○ | ↑ | ↑ |
| Example 37 | 1/10 | 0.34 | SPMA-K (methacrylate with $SO_3K$) | transparent | 4.4 | 100/100 | ○ | ○ | ↑ | ↑ |
| Comparative Example 6 | 1/10 | 0.34 | AMPS | transparent | 12 | 100/100 | ○ | ○ | ↑ | ↑ |
| Comparative Example 7 | 1/10 | 0.34 | sodium acrylate | transparent | 19 | 100/100 | ○ | ○ | ↑ | ↑ |
| Comparative Example 8 | 1/10 | 0.34 | sodium p-stryrenesulfonate | transparent | 28 | 100/100 | ○ | ○ | ↑ | ↑ |

TABLE 12-continued

| | X-41-1805/TEOS (molar ratio) | SH value¹ (meq/g) | Grafting compound | Appearance | Water contact angle | Adhesion* | Abrasion 1** | Abrasion 2*** | Hardening condition of hardened film layer | Heat grafting condition |
|---|---|---|---|---|---|---|---|---|---|---|
| Comparative Example 9 | 1/10 | 0.34 | 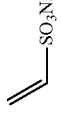 sodium vinyl sulfonate | shedding inhibited application | | | | | ↑ | ↑ |
| Comparative Example 10 | 1/10 | 0.34 |  New Frontier S-510 | transparent | 27 | 100/100 | ○ | ○ | ↑ | ↑ |
| Comparative Example 11 | 1/10 | 0.34 | 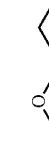 DM·HCl | transparent | 33 | 100/100 | ○ | × | ↑ | ↑ |
| Comparative Example 12 | 1/10 | 0.34 | 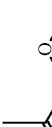 HEMA | transparent | 41 | 100/100 | ○ | ○ | ↑ | ↑ |

*cross-cut test
**steel wool #0000 × 0.1 kg × 10 cycles
***steel wool #0000 × 2 kg × 10 cycles
1: SH value contained in 1 g of a mixture of component (a) and component (b)

Example 38

Preparation of Silane Solution (4)

In a conical flask with a stopper and equipped with a stirrer, 0.55 g (2.5 mmol) of N-(2-aminoethyl)-3-aminopropyl-trimethoxysilane (AAMOS) as the silane compound (a) and 2.60 g (12.5 mmol) of TEOS (tetraethoxysilane) as the component (b) were weighed, and 86.3 g of methanol was added thereto to prepare a uniform solution. Incidentally, the blending molar ratio of the silane compound (a) and the silane compound (b) (silane compound (a)/silane compound (b)) was 1/5.

To the prepared uniform solution, 11.0 g of 5 wt % ammonia water was added, and the mixture was stirred at room temperature for 10 minutes to give a uniform silane solution (4) having 3 wt % solid content.

(Formation of Hardened Film Layer)

A hardened film layer having a residual amino group derived from AAMOS was formed on a surface (water contact angle: 5 to 6°) of a glass plate washed as in Example 1 by applying the silane solution (4) to the glass plate surface with a bar coater #12 and conducting pre-drying at 50° C. for 5 minutes and heat drying at 70° C. for 2 hours. The thickness of the silica layer was about 0.4 μm.

(Grafting)

A film was formed by applying the hydrophilic compound solution (1) prepared in Example 1 to the surface of the resulting hardened film layer under the same conditions as in Example 1 and thereby grafting SPA-K to the amino group of the surface of the hardened film layer. The evaluation results of the resulting film are shown in Table 13.

TABLE 13

| | Component (a) | Component (b) | (a)/(b) (molar ratio) | amine value¹ (meq/g) | Grafting compound | Appearance | Water contact angle | Adhesion* | Abrasion 1** | Abrasion 2*** | Hardening condition of reactive silica | Heat grafting condition |
|---|---|---|---|---|---|---|---|---|---|---|---|---|
| Example 38 | AAMOS | TEOS | 1/5 | 1.58 | SPA-K | transparent | 3.3 | 100/100 | ○ | × | 70° C. for 2 hrs | 150° C. for 1 hr |

*cross-cut test
**steel wool #0000 × 0.1 kg × 10 cycles
***steel wool #0000 × 2 kg × 10 cycles
1: the equivalent number of amine contained in 1 g of a mixture of component (a) and component (b)

Example 39

Preparation of Silane Solution (5)

A silane solution (5) having 4 wt % solid content was prepared as in Example 1 except that a compound (AOMOS) having an acryloyl group was used instead of MPMOS as the silane compound (a).

(Formation of Hardened Film Layer)

A hardened film layer having a residual group (acryloyl group) with a polymerizable carbon-carbon double bond derived from AOMOS was formed on a surface (water contact angle: 5 to 6°) of a glass plate washed as in Example 1 by applying the silane solution (5) to the glass plate surface with a bar coater #10 and conducting pre-drying at 50° C. for 5 minutes and heat drying at 120° C. for 1 hour.

(Preparation of Hydrophilic Compound Solution (2))

SPA-K (2.0 g (8.61 mol)), 2.0 g (100 wt % based on SPA-K) of Darocure 1173 (Ciba Speciality Chemicals Inc.) serving as a UV polymerization initiator, and 100 g of 2-methoxyethanol serving as a solvent were put into a light-resistant sample bottle and were mixed to prepare a uniform hydrophilic compound solution (2) of which hydrophilic monomer concentration was 2 wt %.

(UV Grafting)

The hydrophilic compound solution (2) was applied to the surface of the resulting reactive silica layer with a bar coater #2. After drying in an oven at 50° C. for 5 minutes, grafting reaction was conducted under irradiation (3900 mJ/cm$^2$) with a metal halide lamp (illumination: 130 mW/cm$^2$) for 30 seconds. SPA-K not involved in the reaction (grafting) with the acryloyl group was washed out with water, and drying with an air gun was conducted to give a film. The evaluation results of the resulting film are shown in Table 14.

Examples 40 to 43 and Comparative Examples 13 and 14

Films were formed on glass plates as in Example 38 except that the type of the compound (a) and the blending molar ratio of the compound (a) component and the compound (b) component were modified as shown in Table 13, and were subjected to the tests. The results are shown in Table 14.

TABLE 14

| | Component (a) | Component (b) | (a)/(b) (molar ratio) | carbon-carbon double bond value[1] (meq/g) | Grafting compound | Appearance | Water contact angle | Adhesion* |
|---|---|---|---|---|---|---|---|---|
| Comparative Example 13 | AOMOS | TEOS | 1/0 | 4.27 | SPA-K | transparent | 4.4 | 100/100 |
| Example 39 | AOMOS | TEOS | 1/5 | 0.78 | SPA-K | transparent | 3.4 | 100/100 |
| Example 40 | AOMOS | TEOS | 1/10 | 0.43 | SPA-K | transparent | 3.4 | 100/100 |
| Example 41 | MOMOS | TEOS | 1/10 | 0.43 | SPA-K | transparent | 3.1 | 100/100 |

TABLE 14-continued

| | | | | | |
|---|---|---|---|---|---|
| Example 42 | STMOS: Me—O—Si(—O—Me)(—O—Me)—C₆H₄—CH=CH₂ | TEOS: Si(OEt)₄ | 1/10 | 0.43 | SPA-K: CH₂=CH—C(=O)—O—(CH₂)₄—SO₃K, whiting, 5.1, 100/100 |
| Example 43 | VTES: CH₂=CH—Si(OEt)₃ | TEOS | 1/10 | 0.44 | SPA·K, transparent, 4.1, 100/100 |
| Comparative Example 14 | AOMOS: CH₂=CH—C(=O)—O—(CH₂)₃—Si(OMe)₃ | TEOS | 1/5 | 0.78 | sodium p-styrenesulfonate (C₆H₄—SO₃Na with CH=CH₂), transparent, 15.5, 100/100 |

| | Abrasion 1** | Abrasion 2*** | Hardening condition of reactive silica | Grafting condition |
|---|---|---|---|---|
| Comparative Example 13 | × | × | 120° C. for 1 hr | UV |
| Example 39 | ○ | × | ← | UV |
| Example 40 | ○ | ○ | ← | UV |
| Example 41 | ○ | × | ← | UV |
| Example 42 | ○ | × | ← | UV |
| Example 43 | ○ | × | ← | UV |
| Comparative Example 14 | × | × | | UV |

*cross-cut test
**steel wool #0000 × 0.1 kg × 10 cycles
***steel wool #0000 × 2 kg × 10 cycles
1: the equivalent number of vinyl aromatic group or (meth) acryloyl group contained in 1 g of a mixture of component (a) and component (b)

Example 44

A film was formed on a glass plate as in Example 24 except that a silane solution containing 2.6 g (4.22 mol) of N,N',N"-tris(3-trimethoxysilylpropyl)isocyanurate (TMOSI), instead of 2.6 g (12.5 mmol) of TEOS, was prepared as the compound (b) and that the blending molar ratio of X-41-1805 and TMOSI (X-41-1805/TMOSI) was 1/5, as shown in Table 15, and were subjected to the tests. The results are shown in Table 15.

TABLE 15

| | Component (a) | Component (b) | (a)/(b) (molar ratio) | SH value¹ (meq/g) | Grafting compound | Appearance | Water contact angle | Adhesion* | Abrasion 1** | Abrasion 2*** |
|---|---|---|---|---|---|---|---|---|---|---|
| Example 44 | X-41-1805 | TMOSI | 1/5 | 0.25 | SPA-K | transparent | 2.8 | 100/100 | ○ | × |

Note:
the reactive silica hardening was performed at 120° C. for 1 hr, and the grafting was performed at 150° C. for 1 hr.
1: the equivalent number of SH contained in 1 g of a mixture of component (a) and component (b)
*cross-cut test
**steel wool #0000 × 0.1 kg × 10 cycles
***steel wool #0000 × 2 kg × 10 cycles

Example 45

A film was formed on a glass plate as in Example 24 except that a stainless steel plate washed as in Example 1 and then etched with 2 wt % sulfuric acid (immersion at room temperature for 10 minutes) was used as the base material instead of a glass plate, as shown in Table 16, and were subjected to the tests. The results are shown in Table 16.

Examples 46 and 47

Films were formed as in Example 24 except that the thickness of the hardened film layer was modified, that the base material was a polycarbonate (PC) plate having a surface modified under the conditions shown below (Japanese Patent No. 3557194) instead of a glass plate, and that the heat grafting conditions were 120° C. for 3 hours after pre-drying at 50° C. for 5 minutes, as shown in Table 16, and were subjected to the tests. The results are shown in Table 16.

<ITRO Treatment (Surface Treatment) Condition>

The surface of the base material was treated by letting the base material pass, at a linear velocity of 0.7 m/sec twice, through flame generated by igniting combustible gas prepared by continuously mixing ITRO gas and city gas.

ITRO gas: air compressed gas containing $1.0\times10^{-4}$ mol % tetramethyl silane and $1.0\times10^{-5}$ mol % tetramethoxysilane as surface modifiers, (wherein, the mol % of tetramethyl silane or tetramethoxysilane is that when the total amount of ITRO gas is supposed to be 100 mol %).

TABLE 16

| | Base material | Composition ratio of hardened material layer (molar ratio) | SH value[1] (meq/g) | Thickness of hardened material layer (μm) | Grafting compound | Appearance | Water contact angle | Adhesion* |
|---|---|---|---|---|---|---|---|---|
| Example 45 | stainless steel | X-41-1805/ TEOS = 1/10 | 0.34 | 0.4 | 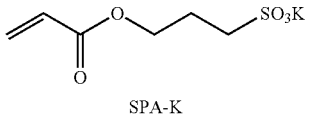 SPA-K | transparent | 4.8 | 100/100 |
| Example 46 | ITRO treated PC | X-41-1805/ TEOS = 1/10 | 0.34 | 0.4 | 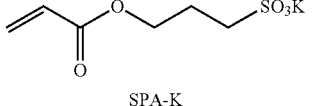 SPA-K | transparent | 6.7 | 100/100 |
| Example 47 | ITRO treated PC | X-41-1805/ TEOS = 1/10 | 0.34 | 3 | 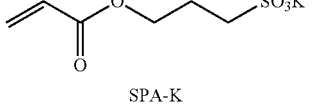 SPA-K | transparent | 6.1 | 100/100 |

| | Abrasion 1 | Abrasion 2 | Hardening condition of reactive silica | Heat grafting condition |
|---|---|---|---|---|
| Example 45 | ○ | ○ | 120° C. for 1 hr | 150° C. for 1 hr |
| Example 46 | ○ | × | 80° C. for 1 hr | 120° C. for 3 hrs |
| Example 47 | ○ | × | ↑ | ↑ |

*cross-cut test
**steel wool #0000 × 0.1 kg × 10 cycles
***steel wool #0000 × 2 kg × 10 cycles
1: the equivalent number of SH contained in 1 g of a mixture of component (a) and component (b)

Example 48

As shown in Table 17, a film was formed on a glass plate as in Example 27 and Example 24. The resulting film was treated under immersion conditions or weather-resistant conditions shown below and then evaluated as in Example 24. The results are shown in Table 17.

(Immersion Condition and Weather-Resistant Condition)

Immersion condition 1 in water: the resulting film was immersed in boiling water (100° C.) for 1 hour;

Immersion condition 2 in water: the resulting film was immersed in hot water (60° C.) for 60 days;

Immersion condition 1 in agent: the resulting film was immersed in Kabi Killer (a product name of Johnson Company, containing hydrochlorite, sodium hydroxide, a surfactant (alkylamine oxide), etc.) for 7 days;

Immersion condition 2 in agent: the resulting film was immersed in Kitchen Hiter (a product name of Kao Corporation, containing sodium hydrochlorite, a cleaning ingredient, etc.) for 7 days; and Weather-resistant condition: the resulting film was placed under the atmosphere of a back panel temperature (BPT) of 63 and a rainfall condition of 18 min/2 hours and was exposed to light with an intensity of 60 W/m² and a wavelength of 300 to 400 nm using a xenon arc lamp for 1000 hours.

Example 49

As shown in Table 17, a film was formed on a glass plate as in Example 24 and was subjected to the tests as in Example 47. The results are shown in Table 17.

Example 50

A film was formed on a glass plate as in Example 24 except that zirconium octylate was added as an additive to the silane mixture so that the amount was 1.0 wt %, as shown in Table 17, and was subjected to the tests as in Example 47. The results are shown in Table 17.

TABLE 17

| | Addition amount of zirconium octylate* (wt %) | Composition ratio of hardened material layer (molar ratio) | SH value[1] (meq/g) | Thickness of hardened material layer (μm) | Grafting compound | | Before the test | |
|---|---|---|---|---|---|---|---|---|
| Example 48 | none | X-41-1805/ TEOS = 1/50 | 0.09 | 0.4 | SPA-K | | appearance water contact angle haze abrasion 2*** cross-cut test | transparent 3.6 0.2% ○ 100/100 |
| Example 49 | none | X-41-1805/ TEOS = 1/10 | 0.34 | 0.4 | SPA-K | | appearance water contact angle haze tabor abrasion test**** (Δ haze) after 100 cycles after 250 cycles abrasion 2*** cross-cut test | transparent 2.6 0.2% 0.6% 0.8% ○ 100/100 |
| Example 50 | *1.0 | X-41-1805/ TEOS = 1/10 | 0.34 | 0.4 | SPA-K | | appearance water contact angle haze tabor abrasion test**** (Δ haze) after 100 cycles after 250 cycles abrasion 2*** cross-cut test | transparent 4.1 0.2% 0.6% 0.8% ○ 100/100 |

| | Immersion in boiling water for 1 hr | Immersion in 60° C. hot water for 60 days | Immersion in Kabi for Killer[2] 7 days | Immersion in Kitchen Hiter[3] for 7 days | Weather resistant test[4] for 1000 hrs |
|---|---|---|---|---|---|
| Example 48 | no change 3.8 0.2% ○ 100/100 | no change 3.4 0.2% ○ 100/100 | | | |
| Example 49 | | no change 2.4 0.2% ○ 100/100 | no change 2.4 0.4% 1.6% 2.1% ○ 100/100 | no change 3.9 0.4% 1.6% 1.9% ○ 100/100 | no change 13.9 0.3% ○ 100/100 |
| Example 50 | | | no change 2.1 0.3% 1.6% 1.8% ○ 100/100 | no change 3.1 0.3% 1.1% 1.3% ○ 100/100 | |

Note:
the reactive silica hardening was performed at 120° C. for 1 hr, and the grafting was performed at 150° C. for 1 hr.
*zirconium octylate was added to a silane solution at 1 wt % based on the total weight of component (a) and component (b)
***steel wool #0000 × 2 kg × 10 cycles
****abrasive wheel: C180-OXF, load 250 g × 2
1: the equivalent number of SH contained in 1 g of a mixture of component (a) and component (b)
2: fungicide of Johnson Company
3: bleach of Kao Corporation
4: xenon arc, 60 W/m$^2$ (300 to 400 nm), BPT 63° C., rainfall 18 min/120 min

Example 51

A film (hydrophilic compound (c): 3-sulfopropyl acrylate (SPA)) formed on a glass plate as in Example 34 was left standing in a laboratory (temperature: 25±3° C., humidity: 35±10%) for from 10 days to 4 months. After the elapse of a predetermined leaving period of time, the film was washed with running water using Bemcot M-3 (Asahi Kasei Corp.) and was dried using an air gun. Then, the water contact angle of the film after each elapsed leaving period of time was measured. The results are shown in Table 18.

Comparative Example 15

A glass plate (not provided with a film) washed as in Example 1 was also left standing as in Example 51. After each elapsed leaving period of time, the water contact angle of the glass plate was measured. The results are shown in Table 18.

TABLE 18

| | Water contact angle (°) | | | | | |
|---|---|---|---|---|---|---|
| | before standing | after 10 days | after 1 month | after 2 months | after 3 months | after 4 months |
| Example 51 | 2.9 | 3.0 | 3.5 | 4.6 | 4.6 | 4.7 |
| Comparative Example 15 | 3.6 | 7.2 | 7.1 | 12.6 | 12.8 | 13.1 |

Example 52

Preparation of Silane Solution (6)

In a conical flask with a stopper and equipped with a stirrer, 1.08 g (1.25 mmol) of X-41-1805 shown in Example 24 as the silane compounds (a) and (b) and 13.0 g (62.5 mmol) of TEOS as the silane compound (b) were weighed, and 152.0 g of methanol was added thereto, followed by stirring to prepare a uniform solution. Incidentally, the blending molar ratio of X-41-1805 (Shin-Etsu Chemical Co., Ltd., mercapto equivalent: 862 g/mol) and TEOS (X-41-180/TEOS) was 1/50.

To the prepared uniform solution, 5.1 g of 5 wt % sulfuric acid was added, and the mixture was stirred at room temperature for 10 minutes for hydrolysis. Then, to the resulting solution, 15.6 g (solid content: 4.7 g) of methanol silica sol (a product name of Nissan Chemical Industries, Ltd., methanol content: 70%) was added. The mixture was stirred to give a uniform silane solution (6) having 10 wt % solid content and a blending weight ratio of X-41-1805, TEOS, and silica (X-41-1805/TEOS/silica) of 1/13/5.

(Formation of Hardened Material Layer)

The silane solution (6) was applied to a surface of a glass plate washed as in Example 1 with a bar coater #30, followed by pre-drying at 50° C. for 5 minutes and then heat drying at 150° C. for 1 hour. The thickness of the resulting hardened material layer was about 3 μm.

(Grafting)

A film was formed on a surface of the resulting hardened film layer as in Example 24, and then was subjected to the tests as in Example 1 and Example 24. The obtained evaluation results are shown in Table 19.

Example 53

Preparation of Silane Solution (7)

As in Example 52, 1.08 g (1.25 mmol) of X-41-1805 as the silane compounds (a) and (b) and 13.0 g (62.5 mmol) of TEOS as the silane compound (b) were weighed in a conical flask with a stopper and equipped with a stirrer, and 7.0 g (29.6 mmol) of 3-glycidoxypropyl trimethoxysilane (hereinafter, referred to as GPMOS, molecular weight: 236.3) as the silane compound (b) was further weighed, and 228.0 g of methanol was added thereto, followed by stirring to prepare a uniform solution. Incidentally, the blending molar ratio of X-41-1805, TEOS, and GPMOS (X-41-1805/TEOS/GPMOS) was 1/50/23.7.

To the prepared uniform solution, 8.0 g of 5 wt % sulfuric acid was added, and the mixture was stirred at room temperature for 10 minutes for hydrolysis. Then, to the resulting solution, 23.3 g (solid content: 7.0 g) of methanol silica sol (silica 1) shown in Example 52 was added, followed by stirring to give a uniform silane solution (7) having 10 wt % solid content and a blending weight ratio of X-41-1805, TEOS, GPMOS, and silica (X-41-1805/TEOS/GPMOS/silica 1) of 1/13/7/7.

(Formation of Hardened Material Layer)

A hardened material layer was formed on a glass plate as in Example 52 using the silane solution (7). The thickness of this hardened material layer was about 3 μm.

(Grafting)

A film was formed on a surface of the resulting hardened film layer as in Example 52, and was then subjected to the tests as in Example 52. The obtained evaluation results are shown in Table 19.

TABLE 19

| | Silane compound | | | | (a)/(b1)/filler/(b4), molar ratio, (weight ratio) | Grafting compound | Appearance | Water contact angle |
|---|---|---|---|---|---|---|---|---|
| | (a) | (b1) | filler | (b4) | | | | |
| Example 52 | X-41-1805 | TEOS | silica[1] | — | 1/50/—/0 (1/13/5/0) | SPA-K | transparent | 2.7 |
| Example 53 | X-41-1805 | TEOS | silica[1] | GPMOS | 1/50/—/24 (1/13/7/7) | SPA-K | transparent | 7.9 |

TABLE 19-continued

|  | Adhesion* | Abrasion 1** | Abrasion 2*** | Taber abrasion test**** | | | Hardening condition of | |
|---|---|---|---|---|---|---|---|---|
|  |  |  |  | haze before the test | Δ haze after 100 cycles | Δ haze after 250 cycles | hardened film layer | Heat grafting condition |
| Example 52 | 100/100 | ○ | ○ | 0.26 | 3.92 | 1.29 | 150° C. for 1 hr | 150° C. for 1 hr |
| Example 53 | 100/100 | ○ | ○ | 0.06 | 1.10 | 1.31 | 150° C. for 1 hr | 150° C. for 1 hr |

[1]methanol silica gel
*cross-cut test
**steel wool #0000 × 0.1 kg × 10 cycles
***steel wool #0000 × 2 kg × 10 cycles
****abrasive wheel: C180-OXF, load 250 g × 2

Example 54

Preparation of Silane Solution (8)

In a conical flask with a stopper and equipped with a stirrer, 3.00 g (15.3 mmol) of MPMOS shown in Example 1 as the silane compound (a) component and 9.6 g (45.8 mmol) of TEOS as the silane compound (b) component were weighed, and 441.0 g of methanol was added thereto. The mixture was stirred to give a uniform solution. Incidentally, the blending molar ratio of MPMOS and TEOS (MPMOS/TEOS) was 1/3.

To the prepared uniform solution, 13.5 g of 5 wt % sulfuric acid was added, and the mixture was stirred at room temperature for 10 minutes for hydrolysis. Then, to the resulting solution, 16.1 g (solid content: 4.8 g) of methanol silica sol shown in Example 52 was added, followed by stirring to give a uniform silane solution (8) having 4 wt % solid content and a blending weight ratio of MPMOS, TEOS, and silica (MPMOS/TEOS/silica) of 1/3.2/1.6.

(Formation of Hardened Material Layer)

A hardened material layer was formed on a glass plate as in Example 1 using the silane solution (8). The thickness of this hardened material layer was about 0.4 μm.

(Grafting)

A film was formed on a surface of the resulting hardened film layer as in Example 52, and was then subjected to the tests as in Example 52. The obtained evaluation results are shown in Table 20.

Example 55

Formation of Hardened Material Layer

A hardened material layer was formed as in Example 54 except that a silane solution prepared by modifying the solid content concentration to 10 wt % without modifying the blending molar ratio of MPMOS and TEOS in the silane solution (8) and the blending weight ratio of MPMOS, TEOS, and silica, as shown in Table 20, and that the silane solution was applied to a glass plate with a bar coater #30. The thickness of this hardened material layer was about 3 μm.

(Grafting)

A film was formed on a surface of the resulting hardened film layer as in Example 52, and was then subjected to the tests as in Example 52. The obtained evaluation results are shown in Table 20.

Reference Example 15 and Comparative Example 16

Films were formed on glass plates as in Example 54 except that blending molar ratio of MPMOS/TEOS in the silane solution (8) and the blending weight ratio of MPMOS/TEOS/silica were modified as shown in Table 20, and were subjected to the tests as in Example 52. The obtained evaluation results are shown in Table 20.

TABLE 20

|  | Silane compound | | | (a)/(b1)/filler, molar ratio, (weight ratio) | Grafting compound | Estimated thickness | Water contact | | |
|---|---|---|---|---|---|---|---|---|---|
|  | (a) | (b) | filler |  |  |  | Appearance | angle | Adhesion* |
| Example 54 | KBM-803 | TEOS | silica[1] | 1/3/— (1/3.2/1.6) | SPA-K | 400 nm | transparent | 5.1 | 100/100 |
| Example 55 | KBM-803 | TEOS | silica[1] | 1/3/— (1/3.2/1.6) | SPA-K | 3 μm | transparent | 4.3 | 100/100 |
| Reference Example 15 | KBM-803 | TEOS | silica[1] | 1/1/— (1/1.1/3.7) | SPA-K | 400 nm | transparent | 4.6 | 100/100 |
| Comparative Example 16 | KBM-803 | — | silica[1] | 1/0/— (1/0/4.8) | SPA-K | 400 nm | transparent | 3.9 | 100/100 |

|  | Abrasion 1** | Abrasion 2*** | Taber abrasion test**** | | | Hardening condition of | |
|---|---|---|---|---|---|---|---|
|  |  |  | haze before the test | Δ haze after 100 cycles | Δ haze after 250 cycles | hardened film layer | Heat grafting condition |
| Example 54 | ○ | x | 0.11 | 1.07 | 0.49 | 120° C. for 1 hr | 150° C. for 1 hr |
| Example 55 | ○ | x | 0.06 | 0.89 | 0.62 | 120° C. for 1 hr | 150° C. for 1 hr |

TABLE 20-continued

| | | | | | | | |
|---|---|---|---|---|---|---|---|
| Reference Example 15 | x | x | 0.11 | 0.90 | 0.80 | 120° C. for 1 hr | 150° C. for 1 hr |
| Comparative Example 16 | x | x | 0.09 | 0.76 | 0.53 | 120° C. for 1 hr | 150° C. for 1 hr |

[1]methanol silica gel
*cross-cut test
**steel wool #0000 × 0.1 kg × 10 cycles
***steel wool #0000 × 2 kg × 10 cycles
****abrasive wheel: C180-OXF, load 250 g × 2

The invention claimed is:

1. A laminate comprising a hydrophilic film, a hardened material layer and an inorganic base material obtained by a process comprising steps of:
   (A) preparing a mixture containing:
   a silane compound (a) including one silicon atom, a group selected from the group consisting of a mercapto group and an amino group, and at least one silicon-bonded group selected from the group consisting of an alkoxy group, a halogen group, and a hydroxyl group, and
   a silane compound (b) including a cross-linkable silicon-bonded group selected from the group consisting of an alkoxy group, a halogen group, and a hydroxyl group, the silane compound (b) not including groups reactive with a carbon-carbon double bond;
   (B) applying the mixture to the inorganic base material to form a hardened material layer on the inorganic base material by a condensation reaction of the mixture;
   (C) applying a solution containing a hydrophilic compound represented by following general formula (c) dissolved in a solvent to a surface of the hardened material layer; and
   (D) forming the hydrophilic film by allowing a direct reaction between at least a part of (meth)acryloyl groups contained in the hydrophilic compound represented by the general formula (c) and at least a part of groups derived from the silane compound (a), being selected from the group consisting of a mercapto group and an amino group by means of heat or radiation rays,

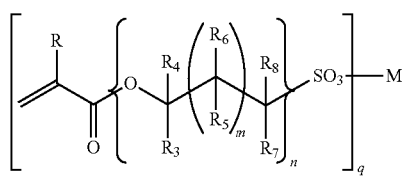

(c)

wherein in the formula (c), R represents H or $CH_3$; $R_3$ to $R_8$ independently represent H, $CH_3$, or OH, represents an integer 0 to 18; n represents an integer of 1 to 10; q represents 1 or 2; and M represents H, Li, Na, K, Rb, Mg, Ca, Sr, or Ba, wherein the molar ratio of the silane compound (a)/the silane compound (b) is 1/2 to 1/200.

2. A method of producing a laminate having a hydrophilic film and a hardened material layer on an inorganic base material produced by:
   (A) preparing a mixture containing:
   a silane compound (a) including one silicon atom, a group selected from the group consisting of a mercapto group and an amino group, and at least one silicon-bonded group selected from the group consisting of an alkoxy group, a halogen group, and a hydroxy group, and
   a silane compound (b) including a cross-linkable silicon-bonded group selected from the group consisting of an alkoxy group, a halogen group, and a hydroxy group and not including groups reactive with a carbon-carbon double bond, wherein the molar ratio of the silane compound (a)/the silane compound (b) is 1/2 to 1/200;
   (B) applying the mixture to the inorganic base material and allowing hydrolysis and condensation reactions to progress and form the hardened material layer on a surface of the inorganic base material;
   (C) applying a solution containing a hydrophilic compound represented by the following general formula (c) dissolved in a solvent to a surface of the hardened material layer; and
   (D) forming the hydrophilic film by allowing a grafting reaction directly between at least a part of (meth)acryloyl groups contained in the hydrophilic compound represented by the general formula (c) and at least a part of groups derived from the silane compound (a), being selected from the group consisting of a mercapto group and an amino group by means of heat or radiation rays to progress and form the hydrophilic film,

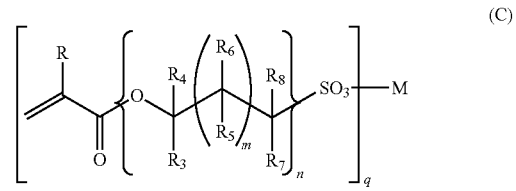

(C)

wherein in the formula (c), R represents H or $CH_3$; $R_3$ to $R_8$ independently represent H, $CH_3$, or OH; m represents an integer of 0 to 18; n represents an integer of 1 to 10; q represents 1 or 2; and M represents H, Li, Na, K, Rb, Mg, Ca, Sr, or Ba.

3. The method of producing a laminate having a hydrophilic film according to claim 2, wherein M of the compound (c) is H, Li, Na, Rb, Mg, Ca, Sr, or Ba; and the grafting reaction is performed under a temperature condition of 130° C. or higher.

4. The laminate according to claim 1, wherein the molar ratio of the silane compound (a)/the silane compound (b) is 1/3 to 1/100.

5. The laminate according to claim 1, wherein the molar ratio of the silane compound (a)/the silane compound (b) is 1/4 to 1/100.

6. The laminate according to claim 1, wherein the molar ratio of the silane compound (a)/the silane compound (b) is 1/3 to 1/50.

7. The laminate according to claim 1, wherein the molar ratio of the silane compound (a)/the silane compound (b) is 1/4 to 1/30.

8. The laminate according to claim 1, wherein the silane compound (a) has the one silicon atom, the mercapto or amino group, and the alkoxy group as the at least one silicon-bonded group, or wherein the silane compound (b) has the alkoxy group as the cross-linkable silicon-bonded group.

9. The laminate according to claim 1, wherein in the formula (c), $R_3$ to $R_8$ each represent H; m represents an integer of 0 to 8; n represents an integer of 1 to 3; and M represents H, Li, Na, K or Ca.

10. The method according to claim 2, wherein the molar ratio of the silane compound (a)/the silane compound (b) is 1/3 to 1/100.

11. The method according to claim 2, wherein the molar ratio of the silane compound (a)/the silane compound (b) is 1/4 to 1/100.

12. The method according to claim 2, wherein the molar ratio of the silane compound (a)/the silane compound (b) is 1/3 to 1/50.

13. The method according to claim 2, wherein the molar ratio of the silane compound (a)/the silane compound (b) is 1/4 to 1/30.

14. The method according to claim 2, wherein the silane compound (a) has the one silicon atom, the mercapto or amino group, and the alkoxy group as the at least one silicon-bonded group, or wherein the silane compound (b) has the alkoxy group as the cross-linkable silicon-bonded group.

15. The method according to claim 2, wherein in the formula (c), $R_3$ to $R_8$ each represent H; m represents an integer of 0 to 8; n represents an integer of 1 to 3; and M represents H, Li, Na, K or Ca.

\* \* \* \* \*